US008465846B2

(12) United States Patent
O'Brien et al.

(10) Patent No.: US 8,465,846 B2
(45) Date of Patent: Jun. 18, 2013

(54) AQUEOUS DISPERSIONS AND COATINGS

(75) Inventors: Robert M. O'Brien, Monongahela, PA (US); Grant Schutte, Pittsburgh, PA (US); Jeffrey Niederst, Leechburg, PA (US); John W. Condit, Cranberry Township, PA (US); Dawn S. Herko, Wexford, PA (US); Daniel E. Rardon, Pittsburgh, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 13/089,045

(22) Filed: Apr. 18, 2011

(65) Prior Publication Data
US 2011/0195213 A1 Aug. 11, 2011

Related U.S. Application Data

(62) Division of application No. 11/624,408, filed on Jan. 18, 2007, now abandoned, which is a division of application No. 10/817,651, filed on Apr. 2, 2004, now Pat. No. 7,189,787.

(60) Provisional application No. 60/459,728, filed on Apr. 2, 2003.

(51) Int. Cl.
C08G 81/00 (2006.01)
C08G 81/02 (2006.01)
C08L 1/00 (2006.01)
B65D 25/14 (2006.01)

(52) U.S. Cl.
CPC .............. *C08G 81/00* (2013.01); *C08G 81/024* (2013.01); *C08L 1/00* (2013.01); *B65D 25/14* (2013.01)
USPC ........... 428/543; 525/194; 525/207; 525/208; 525/221; 525/231; 525/381

(58) Field of Classification Search
CPC .......... C08G 81/00; C08G 81/024; C08L 1/00; B65D 25/14
USPC ................. 428/543; 525/194, 208, 207, 221; 525/231, 381
See application file for complete search history.

(56) References Cited

U.S. PATENT DOCUMENTS

| 2,633,458 | A | 3/1953 | Shokal et al. |
| 3,242,123 | A | 3/1966 | Mayfield et al. |
| 3,335,119 | A | 8/1967 | D'Alelio |
| 3,377,406 | A | 4/1968 | Newey et al. |
| 3,390,206 | A | 6/1968 | Thompson et al. |
| 3,568,486 | A | 1/1969 | Rosenberg et al. |
| 3,477,990 | A | 11/1969 | Dante et al. |
| 3,479,310 | A | 11/1969 | Dieterich et al. |
| 3,547,881 | A | 12/1970 | Mueller et al. |
| 3,547,885 | A | 12/1970 | Dante et al. |
| 3,573,248 | A | 3/1971 | Pedain et al. |
| 3,694,407 | A | 9/1972 | Krikorian et al. |
| 3,733,287 | A | 5/1973 | Masuda et al. |
| 3,738,862 | A | 6/1973 | Klarquist et al. |
| 3,810,859 | A | 5/1974 | Mikofalvy |
| 3,819,567 | A | 6/1974 | Swanson et al. |
| 3,862,914 | A | 1/1975 | Anderson et al. |
| 3,880,793 | A | 4/1975 | Nakayama |
| 3,933,706 | A | 1/1976 | Moyiyama et al. |
| 3,943,187 | A | 3/1976 | Wu |
| 3,945,961 | A | 3/1976 | Blank |
| 3,948,855 | A | 4/1976 | Perry |
| 3,969,300 | A | 7/1976 | Nagata et al. |
| 3,991,216 | A | 11/1976 | Christenson et al. |
| 3,997,694 | A | 12/1976 | Wu |
| 4,021,396 | A | 5/1977 | Wu |
| 4,028,294 | A | 6/1977 | Brown et al. |
| 4,033,920 | A | 7/1977 | Isozaki et al. |
| 4,048,141 | A | 9/1977 | Doorakian et al. |
| 4,064,087 | A | 12/1977 | Das |
| 4,073,775 | A | 2/1978 | Matsuo et al. |
| 4,076,676 | A | 2/1978 | Sommerfeld |
| 4,100,127 | A | 7/1978 | Fukusaki et al. |
| 4,105,811 | A | 8/1978 | Horowitz et al. |
| 4,122,052 | A | 10/1978 | Aihara et al. |
| 4,144,155 | A | 3/1979 | Araki et al. |
| 4,147,679 | A | 4/1979 | Scriven et al. |
| 4,148,670 | A | 4/1979 | Kelly |
| 4,151,143 | A | 4/1979 | Blank et al. |
| 4,174,333 | A | 11/1979 | Hartman et al. |

(Continued)

FOREIGN PATENT DOCUMENTS

EP 0389915 A1 10/1990
EP 0694569 A2 1/1996

(Continued)

OTHER PUBLICATIONS

ASTM International, Designation: D 1200-94 (Reapproved 2005); Standard Test Method for Viscosity by Ford Viscosity Cup; Published Jun. 2005; 4 pages.
ASTM International, Designation: D 2196-05; Standard Test Methods for Rheological Properties for Non-Newtonian Materials by Rotational (Brookfield type) Viscometer; Published Aug. 2005; 5 pages.
ASTM International, Designation: D 5402-93 (Reapproved 1999); Standard Practice for Assessing the Solvent Resistance of Organic Coatings Using Solvent Rubs; Published Jul. 1993; 3 pages.
ASTM International, Designation: D 3359-02; Standard Test Methods for Measuring Adhesion by Tape Test; Published Oct. 2002; 7 pages.
Guidelines for Industry, "Preparation of Food Contact Notifications and Food Additive Petitions for Food Contact Substances: Chemistry Recommendations;" Center for Food Safety and Applied Nutrition; Apr. 2002; Retrieved on Apr. 19, 2006. Retrieved from Internet: <URL:http://www.cfsan.fda.gov/~dms/opa2pmnc.html>, 37 pages.

(Continued)

Primary Examiner — Kelechi Egwim

(57) ABSTRACT

The present invention provides aqueous dispersions that, for example, include the reaction product of an oxirane-functional vinyl addition polymer having an oxirane functionality between 0.5 and 5; an acid-functional polymer having an acid number 30 to 500; and a tertiary amine. Also described are coating compositions containing the dispersion and methods of forming the dispersion.

24 Claims, No Drawings

U.S. PATENT DOCUMENTS

| | | | |
|---|---|---|---|
| 4,191,596 A | 3/1980 | Dollman et al. |
| 4,212,776 A | 7/1980 | Martinez et al. |
| 4,212,781 A | 7/1980 | Evans et al. |
| 4,247,439 A | 1/1981 | Matthews et al. |
| 4,247,659 A | 1/1981 | Sekmakas et al. |
| 4,276,210 A | 6/1981 | Höhlein et al. |
| 4,285,847 A | 8/1981 | Ting |
| 4,289,674 A | 9/1981 | Christenson et al. |
| 4,289,811 A | 9/1981 | Shelley, Jr. |
| 4,294,737 A | 10/1981 | Sekmakas et al. |
| 4,296,011 A | 10/1981 | Sekmakas et al. |
| 4,302,373 A * | 11/1981 | Steinmetz ............... 523/409 |
| 4,303,488 A | 12/1981 | Seiler et al. |
| 4,304,701 A | 12/1981 | Das et al. |
| 4,305,859 A | 12/1981 | McEwan et al. |
| 4,337,185 A | 6/1982 | Wessling et al. |
| 4,347,333 A | 8/1982 | Lorh et al. |
| 4,370,446 A | 1/1983 | Toyoda et al. |
| 4,404,336 A | 9/1983 | Sekmakas et al. |
| 4,413,015 A | 11/1983 | Anderson et al. |
| 4,423,165 A | 12/1983 | Harper et al. |
| 4,425,451 A | 1/1984 | Sekmakas et al. |
| 4,440,897 A | 4/1984 | Maska |
| 4,442,246 A | 4/1984 | Brown et al. |
| 4,443,568 A | 4/1984 | Woo |
| 4,444,923 A | 4/1984 | McCarty |
| 4,446,258 A | 5/1984 | Chu et al. |
| 4,461,857 A | 7/1984 | Sekmakas et al. |
| 4,476,262 A | 10/1984 | Chu et al. |
| 4,477,609 A | 10/1984 | Aluotto et al. |
| 4,480,058 A | 10/1984 | Ting et al. |
| 4,482,673 A | 11/1984 | Brown et al. |
| 4,487,861 A | 12/1984 | Winner |
| 4,497,946 A | 2/1985 | Sekmakas et al. |
| 4,501,831 A | 2/1985 | Chu et al. |
| 4,507,425 A | 3/1985 | Weaver |
| 4,522,961 A | 6/1985 | Martino et al. |
| 4,539,348 A | 9/1985 | Gajria et al. |
| 4,546,014 A | 10/1985 | Gajria et al. |
| 4,560,714 A | 12/1985 | Gajria et al. |
| 4,567,246 A | 1/1986 | Gajria et al. |
| 4,572,610 A | 2/1986 | Krajewski |
| 4,579,888 A | 4/1986 | Kodama et al. |
| 4,585,814 A | 4/1986 | Sekmakas et al. |
| 4,600,737 A | 7/1986 | Georgalas et al. |
| 4,623,680 A | 11/1986 | Azarnia et al. |
| 4,629,491 A | 12/1986 | Swerdloff et al. |
| 4,638,020 A | 1/1987 | Christenson et al. |
| 4,644,030 A | 2/1987 | Loewrigkeit et al. |
| 4,647,612 A | 3/1987 | Ranka et al. |
| 4,670,500 A | 6/1987 | Gupta |
| 4,683,273 A | 7/1987 | Bode |
| 4,692,491 A | 9/1987 | Ranka et al. |
| 4,703,071 A | 10/1987 | Owens |
| 4,741,961 A | 5/1988 | Frisch et al. |
| 4,871,810 A | 10/1989 | Saltman |
| 4,898,911 A | 2/1990 | Miyashita |
| 4,906,684 A | 3/1990 | Say |
| 4,943,359 A | 7/1990 | Patschke et al. |
| 4,946,911 A | 8/1990 | Treybig |
| 4,948,834 A | 8/1990 | Baker et al. |
| 4,963,602 A | 10/1990 | Patel |
| 4,997,865 A | 3/1991 | Scherping et al. |
| 5,051,470 A | 9/1991 | Woo et al. |
| 5,068,266 A | 11/1991 | Kojima et al. |
| 5,082,742 A | 1/1992 | Padwa |
| 5,082,842 A | 1/1992 | Widmer |
| 5,093,392 A | 3/1992 | Woo et al. |
| 5,096,992 A | 3/1992 | Ross et al. |
| 5,116,888 A | 5/1992 | Woo et al. |
| 5,157,078 A | 10/1992 | Woo et al. |
| 5,166,289 A | 11/1992 | Yezrielev et al. |
| 5,173,526 A | 12/1992 | Vijayendran et al. |
| 5,177,129 A | 1/1993 | Bobo, Jr. |
| 5,196,055 A | 3/1993 | Lesney et al. |
| 5,196,481 A | 3/1993 | Owens et al. |
| 5,201,436 A | 4/1993 | Owens et al. |
| 5,212,241 A | 5/1993 | Woo et al. |
| 5,252,637 A | 10/1993 | Craun et al. |
| 5,252,669 A | 10/1993 | Maska et al. |
| 5,264,469 A | 11/1993 | Mysliwczyk et al. |
| 5,270,356 A | 12/1993 | Katamoto et al. |
| 5,290,828 A | 3/1994 | Craun et al. |
| 5,296,525 A | 3/1994 | Spencer |
| 5,342,864 A | 8/1994 | Craun et al. |
| 5,344,858 A | 9/1994 | Hart et al. |
| 5,387,625 A | 2/1995 | Parekh et al. |
| 5,416,165 A | 5/1995 | Okimura et al. |
| 5,428,084 A | 6/1995 | Swarup et al. |
| 5,464,885 A | 11/1995 | Craun |
| 5,500,463 A | 3/1996 | Nishimura et al. |
| 5,504,145 A | 4/1996 | Treasurer |
| 5,506,328 A | 4/1996 | Chandalia et al. |
| 5,508,325 A | 4/1996 | Craun et al. |
| 5,527,840 A | 6/1996 | Chutko et al. |
| 5,532,297 A | 7/1996 | Woo et al. |
| 5,554,671 A | 9/1996 | Craun et al. |
| 5,576,063 A | 11/1996 | Briggs et al. |
| 5,576,361 A | 11/1996 | Craun |
| 5,612,415 A | 3/1997 | Loney-Crawford |
| 5,623,085 A | 4/1997 | Gebhard et al. |
| 5,672,653 A | 9/1997 | Frisch et al. |
| 5,686,511 A | 11/1997 | Bobo |
| 5,693,723 A | 12/1997 | Green |
| 5,714,539 A | 2/1998 | Perez |
| 5,723,555 A | 3/1998 | Swarup et al. |
| 5,733,970 A | 3/1998 | Craun |
| 5,739,215 A | 4/1998 | Westerhof et al. |
| 5,767,175 A | 6/1998 | Kamekura et al. |
| 5,780,532 A | 7/1998 | Noda et al. |
| 5,792,804 A | 8/1998 | Cibura et al. |
| 5,811,484 A * | 9/1998 | Wilfinger et al. ............. 524/548 |
| 5,830,952 A | 11/1998 | Pedersen et al. |
| 5,840,384 A | 11/1998 | Noda et al. |
| 5,859,107 A | 1/1999 | Jones et al. |
| 5,869,552 A | 2/1999 | Pedersen et al. |
| 5,869,568 A | 2/1999 | Maeda |
| 5,877,239 A | 3/1999 | Craun et al. |
| 5,898,049 A | 4/1999 | Müller et al. |
| 5,907,012 A | 5/1999 | Voss et al. |
| 5,919,527 A | 7/1999 | Fitzgerald |
| 5,922,817 A | 7/1999 | Pedersen et al. |
| 5,939,482 A | 8/1999 | Kriessmann et al. |
| 5,942,563 A | 8/1999 | DeGraaf |
| 5,962,620 A | 10/1999 | Reich et al. |
| 5,972,432 A | 10/1999 | Chutko et al. |
| 5,976,615 A | 11/1999 | Menovcik et al. |
| 5,976,700 A | 11/1999 | Chutko |
| 5,993,972 A | 11/1999 | Reich et al. |
| 6,008,273 A | 12/1999 | Leibelt et al. |
| 6,040,062 A | 3/2000 | McGee et al. |
| 6,046,256 A | 4/2000 | Nakamura et al. |
| 6,048,924 A | 4/2000 | Obayashi et al. |
| 6,083,585 A | 7/2000 | Cahill et al. |
| 6,087,417 A | 7/2000 | Stevenson et al. |
| 6,126,999 A | 10/2000 | Tomasino et al. |
| 6,136,927 A | 10/2000 | Swarup et al. |
| 6,194,513 B1 | 2/2001 | Sagiv |
| 6,262,217 B1 | 7/2001 | Tallmadge et al. |
| 6,274,660 B1 | 8/2001 | Zeller et al. |
| 6,300,428 B1 | 10/2001 | Stevenson et al. |
| 6,306,934 B1 | 10/2001 | Bode et al. |
| 6,339,125 B1 | 1/2002 | Bechara et al. |
| 6,346,307 B1 | 2/2002 | Al Ghatta et al. |
| 6,359,062 B1 | 3/2002 | Mallen |
| 6,429,254 B2 | 8/2002 | Schafheutle et al. |
| 6,432,486 B1 | 8/2002 | Paris et al. |
| 6,465,559 B1 | 10/2002 | Bechara et al. |
| 6,514,619 B2 | 2/2003 | Shimada et al. |
| 6,576,689 B2 | 6/2003 | Noda et al. |
| 6,627,316 B1 | 9/2003 | Matsuki et al. |
| 6,635,735 B1 | 10/2003 | Zhang et al. |
| 6,660,394 B1 | 12/2003 | Ishizuki et al. |
| 6,706,794 B1 | 3/2004 | Tsuda et al. |
| 6,790,904 B2 | 9/2004 | White et al. |
| 6,831,136 B2 | 12/2004 | Chao et al. |
| 6,930,143 B2 | 8/2005 | Harris et al. |

| | | |
|---|---|---|
| 7,053,149 B2 | 5/2006 | Anderson et al. |
| 7,063,895 B2 | 6/2006 | Rodrigues et al. |
| 7,268,176 B2 | 9/2007 | Ambrose et al. |
| 7,375,174 B2 | 5/2008 | Ramesh et al. |
| 7,459,167 B1 | 12/2008 | Sengupta et al. |
| 7,475,786 B2 | 1/2009 | McVay |
| 7,479,519 B2 | 1/2009 | Krishnan |
| 7,527,864 B2 | 5/2009 | Miller |
| 7,534,830 B2 | 5/2009 | Williams |
| 7,592,047 B2 | 9/2009 | O'Brien et al. |
| 7,666,951 B2 | 2/2010 | Jennings et al. |
| 7,737,243 B2 | 6/2010 | Adams et al. |
| 7,745,508 B2 | 6/2010 | Kiefer-Liptak et al. |
| 7,858,162 B2 | 12/2010 | Fuhry et al. |
| 7,897,704 B2 | 3/2011 | Masselin et al. |
| 7,910,170 B2 | 3/2011 | Evans et al. |
| 7,981,515 B2 | 7/2011 | Ambrose et al. |
| 8,092,876 B2 | 1/2012 | O'Brien et al. |
| 8,129,495 B2 | 3/2012 | Evans et al. |
| 8,138,262 B2 | 3/2012 | Perrine |
| 8,142,868 B2 | 3/2012 | O'Brien et al. |
| 8,173,265 B2 | 5/2012 | O'Brien et al. |
| 2003/0069380 A1 | 4/2003 | Flat et al. |
| 2004/0167252 A1 | 8/2004 | Melchiors et al. |
| 2004/0171746 A1 | 9/2004 | Parekh et al. |
| 2004/0259989 A1 | 12/2004 | O'Brien et al. |
| 2005/0084686 A1 | 4/2005 | Imaizumi |
| 2005/0182155 A1 | 8/2005 | O'Dell et al. |
| 2005/0192400 A1 | 9/2005 | Killilea et al. |
| 2007/0027249 A1 | 2/2007 | Killilea |
| 2007/0031679 A1 | 2/2007 | Ushida et al. |
| 2008/0009601 A1 | 1/2008 | Killilea et al. |
| 2008/0166485 A1 | 7/2008 | Steenwinkel et al. |
| 2009/0047531 A1 | 2/2009 | Bartley et al. |
| 2009/0220795 A1 | 9/2009 | Connelly et al. |
| 2010/0075084 A1 | 3/2010 | O'Brien et al. |
| 2010/0160561 A1 | 6/2010 | Coca et al. |
| 2010/0183835 A1 | 7/2010 | O'Brien et al. |
| 2010/0184901 A1 | 7/2010 | Adochio et al. |
| 2010/0222493 A1 | 9/2010 | Kiefer-Liptak et al. |
| 2010/0282248 A1 | 11/2010 | Schutte et al. |
| 2011/0008615 A1 | 1/2011 | Myers |
| 2011/0195213 A1 | 8/2011 | O'Brien et al. |
| 2011/0244157 A1 | 10/2011 | Singer et al. |
| 2012/0116048 A1 | 5/2012 | Evans et al. |
| 2012/0145721 A1 | 6/2012 | Cavallin et al. |

FOREIGN PATENT DOCUMENTS

| | | |
|---|---|---|
| EP | 0964031 A2 | 12/1999 |
| EP | 0967198 B1 | 4/2003 |
| EP | 2033992 A2 | 3/2009 |
| EP | 2042535 A1 | 4/2009 |
| EP | 1427782 B1 | 1/2010 |
| GB | 1513866 A | 6/1978 |
| GB | 2152065 A | 7/1985 |
| JP | 5339387 | 4/1978 |
| JP | 5397083 | 8/1978 |
| JP | 5043830 | 2/1993 |
| JP | 6073308 | 3/1994 |
| JP | 10158528 | 3/1994 |
| JP | 6137272 A | 5/1994 |
| JP | 6137282 A | 5/1994 |
| JP | 10139839 | 5/1998 |
| JP | 2002138245 | 5/2002 |
| JP | 2002155234 | 5/2002 |
| JP | 2006077049 | 3/2003 |
| JP | 2003321646 | 11/2003 |
| JP | 2004026913 | 1/2004 |
| JP | 2005089716 | 4/2005 |
| JP | 2005179491 | 7/2005 |
| JP | 2007238698 | 9/2007 |
| JP | 2008297379 | 12/2008 |
| WO | 9308154 A1 | 4/1993 |
| WO | 0049072 A1 | 8/2000 |
| WO | 0192366 A1 | 12/2001 |
| WO | 02064691 A2 | 8/2002 |
| WO | 03076530 A2 | 9/2003 |
| WO | 2004055086 A1 | 7/2004 |
| WO | 2004090020 A1 | 10/2004 |
| WO | 2007138111 A1 | 12/2007 |
| WO | 2010097353 A1 | 9/2010 |

OTHER PUBLICATIONS

21 C.F.R. §175.300 Resinous and polymeric Coatings; Retrieved on Apr. 19, 2006. Retrieved from Internet: <URL: http://a257.g.akamaitech.net/7/257/2422/01apr20051500/edocket.access.gpo.gov/cfr_2005...>; 27 pages.

Wang, Niangui, et al., Synthesis of glycidyl methacrylate, "Thermosetting Resin", vol. 17, No. 1, p. 27-28, Jan. 2002 (2 pages) [English-language abstract at p. 28].

ACO Polymer Products Inc., "Chemical Resistance", http://www.acousa.com/tech_chemresist.htm (downloaded Jun. 11, 2012), ACO USA 2005, pp. 1-3.

American Architectural Manufacturers Association (AAMA), "AAMA Standards Comparison—Organic Coatings on Aluminum Extrusions and Panels", http://www.aamanet.org/upload/file/2603-2604-2605_Comparisons_4-6-11.pdf, (2011) (1 page).

American Architectural Manufacturers Association (AAMA), "Voluntary Specification, Performance Requirements and Test Procedures for Pigmented Organic Coatings on Aluminum Extrusions and Panels", http://www.ppg.com/corporate/ideascapes/SiteCollectionDocuments/260302_LA.pdf, AAMA 2603-02 (Dec. 2002), pp. 1-8 (8 pages).

American Architectural Manufacturers Association (AAMA), "Voluntary Specification, Performance Requirements and Test Procedures for Superior Performing Organic Coatings on Aluminum Extrusions and Panels", http://www.ppg.com/corporate/ideascapes/SiteCollectionDocuments/260505_LA.pdf, AAMA 2605-05 (Jul. 2005), pp. 1-7 (10 pages).

Blank, "The Slow and Winding Road to "Zero" Voc", International Waterborne, High-Solids and Powder Coatings Symposium, New Orleans, LA USA, (Feb. 21-23, 2001), (16 pages).

Braun, Dietrich, et al., Polymer Synthesis: Theory and Practice, 130 (Springer-Verlag 2001), 3 pages.

Brotons et al., "Xenoestrogens Released from Lacquer Coatings in Food Cans", Environmental Health Perspectives, (1995) vol. 103(6), pp. 608-612.

Carpenter Technology Corporation, "Carpenter CTSTM BD1 Alloy" (Technical Datasheet), www.cartech.com/AlloyTechZone.html., (Jun. 9, 2010), pp. 1-5.

Censullo et al., "Correlation Between Solids Content and Hiding as it Relates to Calculation of VOC Content in Architectural Coatings", Final Report on Standard Agreement No. 01-307, (Dec. 17, 2004), California Environmental Protection Agency, Air Resources Board, Research Division, pp. 1-110.

Chattopadhyay, et al., "Effect of Chain Extender on Phase Mixing and Coating Properties of Polyurethane Ureas," Ind. Eng. Chem. Res., 2005, vol. 44, p. 1772-1779 (8 pages).

Chiang, Wen-Yen, et al., Preparation and Properties of Liquid Crystalline Alkyd Resin with para-Hydroxybenzoic Acid Mesogenic Side Chain, 46 Journal of Applied Polymer Science, 1279-1290 (1992) (12 pages).

CYRO Industries, Cyro Acrylite Acrylic Sheet ,"Chemical Resistance in General Use", http://plexiglasssheets.info/howto/images/ChemResistanceChart.pdf, (2001),1554B-0901-5RA, © 2001, Cyro Industries, USA, (2 pages).

Deflorian et al., "Degradation Mechanism of Electrodeposited Coatings in Alkaline Solution", Progress in Organic Coatings, (2003), vol. 47(2), pp. 103-111.

Goldschmidt et al., "Coating Industries" (Chapter 7), BASF Handbook on Basics of Coating Technology, Elsevier Science (Jan. 15, 2003), (71 pages).

Good, "Recent Advances in Metal Can Interior Coatings", In Food and Packaging Interactions, (Mar. 9, 1988), Hotchkiss, J.; ACS Symposium Series; American Chemical Society: Washington, DC, 1988, Chapter 17, pp. 204-216.

JYI Shyang Industrial Co., Ltd., "ALUCOMAT: Aluminium Composite Panel", (2003), (13 pages).

Koleske (editor), "Paint and Coating Testing Manual: Fourteenth Edition of the Gardner-Sward Handbook", ASTM Manual Series, (Jun. 1995), Chapters 44, 47 and 57-67.

Kosusko et al., "Pollution Prevention Research for Organic Air Emissions", Prepared for: The IInd International Symposium on Characterization & Control of Odours & VOC in the Process Industries, Hotel de Lauzelle Louvain-1 a-Neuve, Belgium, (Nov. 5, 1993), (13 pages).

Marshall et al., "Pollution Prevention and the Use of Low-VOC/HAP Coatings at Wood Furniture Manufacturing Facilities", (1999), U.S. Environmental Protection Agency, Office of Research and Development, National Environmental Research Laboratory, Air Pollution Prevention and Control Division, pp. 1-13.

MAS Paints, "Chemaline #500", http://www.maspaints.com/technical_datas/epoxies/chemaline_500.pdf (2004) (2 pages).

Melchiors et al., "Recent Developments in Aqueous Two-Component Polyurethane (2K-PUR) Coatings", Progress in Organic Coatings, (Dec. 2000), vol. 40 (1), pp. 99-109.

Montanari et al., "Quality of Organic Coatings for Food Cans: Evaluation Techniques and Prospects of Improvement", Progress in Organic Coatings, (Feb. 1996), vol. 29; pp. 159-165.

Murphy et al., "Metals", Migration from Food Contact Materials, (1996), First Edition, pp. 111-144.

NIBCO® Chem-Guide, "Chemical Resistance Information for Plastic and Metal Valves and Fittings", Catalog c-crg-1011, http://www.nibco.com/assets/ChemGuide.pdf, (2011), pp. 1-30 (32 pages).

Nomex, "Technical Guide for NOMEX® Brand Fiber", http://www2.dupont.com/Personal_Protection/en_US/assets/downloads/nomex/Nomex_Technical_Guide.pdf, H-52720 (Revised Jul. 2001), pp. 1-36, (40 pages).

Pourreau et al., "Formulating VOC-Compliant Coatings with Exempt Solvents—A Case Study on Tertiary-Butyl Acetate (TBAc™)", Paint & Coatings Industry Magazine, (Nov. 1999), vol. 15(11), (12 pages).

PPG Industries, Inc., "CORAFLON® ADS Coatings Product Data", http://www.ppg.com/corporate/ideascapes/SiteCollectionDocuments/CoraflonADS.pdf, (May 2006), (2 pages).

PPG Industries, Inc., "DURANAR® ULTRA-Cool® Test Performance", PPG-100, (Jan. 2009), (1 page).

PPG Industries, Inc., "DURANAR® VARI-Cool® Test Performance", PPG-101(Jan. 2009), (2 pages).

PPG Industries, Inc., "POWERCON® 920H Technical Bulletin", http://www.ppg.com/coatings/electrocoat/technicalbulletins/Documents/POWERCRON%20920H%20Technical%20Bulletin.pdf, (Feb. 28, 2011), (1 page).

PPG Industries, Inc., "PPG Industrial Coatings—Coil", http://www.ppg.com/coatings/industrial/markets/coilcoatings/Pages/default.aspx, (2 pages).

PPG Industries, Inc., "PPG Laboratory Test Results Certification—Detergent Resistance", http://www.ppg.com/corporate/ideascapes/SiteCollectionDocuments/DetergentResistDuranarXLE.pdf, (May 1, 2002), (1 page).

PPG Industries, Inc., "SUPERL® II ULTRA-Cool®", PPG-102, (Jan. 2009), (2 pages).

R.N. Tharanathan, "Biodegradable Films and Composite Coatings: Past, Present and Future", Trends in Food Science & Technology, (2003) 14, pp. 71-78 (8 pages).

Randall, "Pollution Prevention Methods in the Surface Coating Industry", Journal of Hazardous Materials, (1992), vol. 29, pp. 275-295.

Random House Webster's College Dictionary, p. 682 (1992) (3 pages).

Raven Lining Systems, "Chemical Resistance", http://ravenlining.com/Portals/4/PDFs/RLS%20Chemical%20Resistance%20Chart.pdf, (2006), (2 pages).

Simal-Gandara, "Selection of Can Coatings for Different Applications", Food Reviews International, (1999), vol. 15(1), pp. 121-137.

Slinckx et al., "High-Solids Automotive Coatings", Progress in Organic Coatings, (Jun. 2000), vol. 38(3), pp. 163-173.

Synthopol Chemie, "SYNTHALAT A600", http://www.synthopol.com/fileadmin/user_upload/produkt_pdfs/1SYNTHALAT%20A%20600_en.pdf, (Apr. 2008), pp. 1.

Szycher, et al., "Development of an Aliphatic Biomedical-Grade Polyurethane Elastomer," Journal of Elastomers and Plastics, 1983, vol. 15, p. 81-95 (16 pages).

Turner, T.A., Canmaking. The Technology of Metal Protection and Decoration, 2-38 (Blackie Academic and Professional 1998) (23 pages).

T.A. Turner, "Canmaking—The Technology of Metal Protection and Decoration", Blackie Academic & Professional (1998), Chapters 2 and 10, (69 pages).

Tripathi, "Practical Guide to Polypropylene", Rapra Practical Guide Series, (Apr. 2002), pp. 60, (2 pages).

* cited by examiner

AQUEOUS DISPERSIONS AND COATINGS

CROSS REFERENCE TO RELATED APPLICATION

This is a divisional of U.S. patent application Ser. No. 11/624,408 filed Jan. 18, 2007, which itself is a divisional of U.S. patent application Ser. No. 10/817,651 filed Apr. 2, 2004 (now U.S. Pat. No. 7,189,787), which claims priority to U.S. Provisional Patent Application Ser. No. 60/459,728, filed Apr. 2, 2003. All of these applications are incorporated herein by reference in their entirety.

BACKGROUND

A wide variety of coatings have been used to coat the surfaces of packaging articles (e.g., food and beverage cans). For example, metal cans are sometimes coated using "coil coating" operations, i.e., a planar sheet of a suitable substrate (e.g., steel or aluminum metal) is coated with a suitable composition and cured. The coated substrate then is formed into the can end or body. Alternatively, liquid coating compositions may be applied (e.g., by spraying, dipping, rolling, etc.) to the substrate and then cured.

Packaging coatings should preferably be capable of high-speed application to the substrate and provide the necessary properties when cured to perform in this demanding end use. For example, the coating should be safe for food contact, have excellent adhesion to the substrate, and resist degradation over long periods of time, even when exposed to harsh environments.

Many current packaging coatings contain mobile or bound bisphenol A ("BPA") or aromatic glycidyl ether compounds or PVC compounds. Although the balance of scientific evidence available to date indicates that the small trace amounts of these compounds that might be released from existing coatings does not pose any health risks to humans, these compounds are nevertheless perceived by some people as being potentially harmful to human health. Consequently, there is a strong desire to eliminate these compounds from food contact coatings.

From the foregoing, it will be appreciated that what is needed in the art is a packaging container (e.g., a food or beverage can) that is coated with a composition that does not contain extractible quantities of such compounds. Such packages, compositions and methods for preparing the same are disclosed and claimed herein.

SUMMARY

The present invention relates to novel aqueous dispersions that are suitable for use as coating compositions and methods of coating substrates using these dispersions.

A dispersion of the present invention preferably includes the reaction product of (i) an oxirane-functional vinyl addition polymer; (ii) an acid-functional polymer (e.g., an acid-functional vinyl addition polymer or an acid-functional polyester resin); and (iii) a tertiary amine. The reaction product is preferably dispersed in a carrier (e.g., water) with optional crosslinkers and other optional adjuvants. Preferred compositions and dispersions are substantially free of mobile BPA and aromatic glycidyl ether compounds (e.g., BADGE, BFDGE and epoxy novalacs).

In one embodiment, the method includes: providing an oxirane-functional vinyl addition polymer having an oxirane functionality of 0.5 to 5; providing an acid-functional polymer having an acid number of 30 to 500; reacting the oxirane-functional vinyl addition polymer and the acid-functional polymer together in the presence of a tertiary amine to form a water-dispersible polymer; and dispersing the water-dispersible polymer in a carrier that includes water.

In one presently preferred embodiment: (i) the oxirane-functional vinyl polymer is the reaction product of 1 to 10 wt. % oxirane-functional monomer, 0 to 60 wt. % hydroxy-functional monomer, and the balance other monomer (e.g., non-functional monomer); and the polymer has an oxirane functionality of 0.5 to 5 and a number average molecular weight of 2,500 to 20,000; (ii) the acid-functional polymer is a vinyl polymer formed as the reaction product of an acid-functional monomer (more preferably at least 15 wt. % acid-functional monomer), and the balance other monomer (e.g., non-functional monomer); and the polymer has an acid number of 30 to 500 (more preferably 100 to 500) and a number average molecular weight of 2,000 to 15,000; (iii) the tertiary amine is dimethyl ethanol amine or the like; (iv) wherein the aforementioned polymers are reacted together in the presence of the tertiary amine to form at least some quaternary ammonium salt, with a weight ratio of (i):(ii) of 90:10 to 50:50, and with a ratio of amine:oxirane groups of 0.8:1 to 5:1; and (v) the reacted polymers are dispersed in water.

In another embodiment, the present invention provides a method, that includes: providing an oxirane-functional vinyl addition polymer having an oxirane functionality of 0.5 to 5; providing an acid-functional polymer having an acid number of 30 to 500; providing a tertiary amine; combining the acid-functional polymer with the tertiary amine to form a mixture and at least partially neutralize the acid-functional polymer; and combining the oxirane-functional vinyl addition polymer and the mixture to form a water-dispersible polymer; and dispersing the water-dispersible polymer in a carrier that includes water. In certain embodiments, the mixture is added over a period of time to the oxirane-functional vinyl addition polymer.

In another embodiment, the present invention provides a method, that includes: providing a first set of monomers for making an oxirane-functional vinyl addition polymer having an oxirane functionality of 0.5 to 5; providing a second set of monomers for making an acid-functional polymer having an acid number of 30 to 500; providing a tertiary amine; polymerizing at least one set of the monomers to form a first polymer; polymerizing the other set of monomers in the presence of the first polymer; adding tertiary amine to form a water-dispersible polymer; and dispersing the water-dispersible polymer in a carrier that includes water. In certain embodiments, polymerizing at least one of the sets of monomers occurs in the presence of the other set of monomers. Alternatively, in certain embodiments, polymerizing at least one of the sets of monomers occurs prior to addition of the other set of monomers.

The present invention also provides a composition that includes an aqueous dispersion of a quaternary ammonium salt, wherein the salt includes the reaction product of an oxirane-functional vinyl addition polymer having an oxirane functionality of 0.5 to 5; an acid-functional polymer having an acid number of 30 to 500; and a tertiary amine.

In another embodiment, the present invention includes a coating composition that includes: an aqueous dispersion of a quaternary ammonium salt, wherein the salt includes the reaction product of an oxirane-functional vinyl addition polymer having an oxirane functionality of 0.5 to 5; an acid-functional polymer having an acid number of 30 to 500; and a tertiary amine; and a crosslinker.

The present invention provides methods of coating an article. Such methods include applying a composition of the present invention to a substrate surface and hardening the composition.

The present invention also provides articles. In one embodiment, the article includes a substrate having an uncured film thereon, wherein the film includes an aqueous dispersion of a quaternary ammonium salt, wherein the salt includes the reaction product of an oxirane-functional vinyl addition polymer having an oxirane functionality of 0.5 to 5; an acid-functional polymer having an acid number of 30 to 500; and a tertiary amine. In certain embodiments, the uncured film further includes a crosslinker.

In another embodiment, the article includes a substrate having a cured film thereon, wherein the cured film is preparable from a coating composition that includes an aqueous dispersion of a quaternary ammonium salt, wherein the salt includes the reaction product of an oxirane-functional vinyl addition polymer having an oxirane functionality of 0.5 to 5; an acid-functional polymer having an acid number of 30 to 500; a tertiary amine; and an optional crosslinker.

In yet another embodiment, the article includes a substrate having a cured film thereon, wherein the cured film includes a crosslinked polymer having a crosslink segment of the general formula:

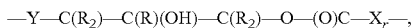

wherein: Y is a divalent organic group, more preferably a divalent organic group that includes a C(O)O moiety; X is a divalent organic group; R is H, or a C1 to C6 organic group, preferably H; and r is 0 or 1, preferably 0.

DEFINITIONS

The term "substantially free" of a particular mobile compound means that the compositions of the present invention contain less than 1000 parts per million (ppm) of the recited mobile compound. The term "essentially free" of a particular mobile compound means that the compositions of the present invention contain less than 100 parts per million (ppm) of the recited mobile compound. The term "essentially completely free" of a particular mobile compound means that the compositions of the present invention contain less than 5 parts per million (ppm) of the recited mobile compound. The term "completely free" of a particular mobile compound means that the compositions of the present invention contain less than 20 parts per billion (ppb) of the recited mobile compound.

The term "mobile" means that the compound can be extracted from the cured coating when a coating (typically approximately 1 mg/cm$^2$ thick) is exposed to a 10 weight percent ethanol solution for two hours at 121° C. followed by exposure for 10 days in the solution at 49° C.

If the aforementioned phrases are used without the term "mobile" (e.g., "substantially free of XYZ compound") then the compositions of the present invention contain less than the aforementioned amount of the compound whether the compound is mobile in the coating or bound to a constituent of the coating.

The term "organic group" means a hydrocarbon (i.e., hydrocarbyl) group with optional elements other than carbon and hydrogen in the chain, such as oxygen, nitrogen, sulfur, and silicon that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated linear or branched hydrocarbon group with one or more carbon-carbon double bonds, such as a vinyl group. The term "alkynyl group" means an unsaturated linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.). Substitution is anticipated on the organic groups of the polymers used in the coating compositions of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "hydrocarbyl moiety" refers to unsubstituted organic moieties containing only hydrogen and carbon.

As used herein, the terms "vinyl addition polymer" or "vinyl addition copolymer" is meant to include acrylate, methacrylate, and vinyl polymers and copolymers. Unless otherwise indicated, a reference to a "polymer" is also meant to include a copolymer. Unless otherwise indicated, a reference to a "(meth)acrylate" compound (where "meth" is bracketed) is meant to include both acrylate and methacrylate compounds.

The term "dispersible" in the context of a dispersible polymer means that the polymer can be mixed into a carrier to form a macroscopically uniform mixture without the use of high shear mixing. The term "dispersible" is intended to include the term "soluble." In other words, a soluble polymer is also a dispersible polymer.

The term "water-dispersible" in the context of a water-dispersible polymer means that the polymer can be mixed into water to form a macroscopically uniform mixture without the use of high shear mixing. The term "water-dispersible" is intended to include the term "water-soluble." In other words, a water-soluble polymer is also considered to be a water-dispersible polymer.

The term "dispersion" in the context of a dispersible polymer refers to the mixture of a dispersible polymer and a carrier. The term "dispersion" is intended to include the term "solution."

DETAILED DESCRIPTION OF ILLUSTRATIVE EMBODIMENTS

The present invention provides novel dispersions (e.g., water-based dispersions) that are suitable for use as coating compositions and methods of coating substrates using these dispersions. Preferred dispersions include a water-dispersible polymer having reacted oxirane and acid groups and a carrier that includes water.

In one specific embodiment, the dispersion includes the reaction product of (i) an oxirane-functional vinyl addition polymer; (ii) an acid-functional polymer; and (iii) a tertiary amine. The reaction product is dispersed in a carrier (e.g., water) with optional crosslinkers and other optional adjuvants.

Thus, in one embodiment, the water-dispersible polymer is formed from preformed polymers (e.g., oxirane-functional vinyl addition polymer and acid-functional polymer) in the presence of a tertiary amine. In another embodiment, the water-dispersible polymer is formed from at least one preformed polymer (e.g., either an oxirane-functional vinyl addition polymer or an acid-functional polymer) that is reacted with monomers for the other polymer in the presence of a tertiary amine. In another embodiment, the water-dispersible polymer is formed from a reaction mixture in which at least one polymer (e.g., either an oxirane-functional vinyl addition polymer or an acid-functional polymer) is formed in situ prior to reaction with monomers for the other polymer in the presence of a tertiary amine. If desired, an acid-functional polymer can be combined with a tertiary amine to at least partially neutralize it prior to reaction with the an oxirane-functional polymer or monomers for formation of an oxirane-functional polymer.

Preferred compositions and dispersions are substantially free of mobile BPA and aromatic glycidyl ether compounds (e.g., BADGE, BFDGE and epoxy novalacs), more preferably essentially free of these compounds, even more preferably essentially completely free of these compounds, and most preferably completely free of these compounds. The coating composition is also preferably substantially free of bound BPA and aromatic glycidyl ether compounds, more preferably essentially free of these compounds, most preferably essentially completely free of these compounds, and optimally completely free of these compounds.

Suitable oxirane-functional vinyl addition polymers include acrylate, methacrylate, and/or vinyl polymers and copolymers having oxirane functional groups (including, e.g., (meth)acrylate copolymers having pendant glycidyl groups).

In one embodiment, the oxirane-functional vinyl addition polymer is formed by reacting one or more oxirane-functional monomers, optional hydroxy-functional monomers, and one or more other monomers (e.g., non-functional monomers). This reaction is conveniently carried out in solution, though other neat processes may be used if desired.

Suitable oxirane-functional monomers include monomers having a reactive carbon-carbon double bond and an oxirane (i.e., a glycidyl) group. Typically, the monomer is a glycidyl ester of an alpha, beta-unsaturated acid, or anhydride thereof. Suitable alpha, beta-unsaturated acids include monocarboxylic acids or dicarboxylic acids. Examples of such carboxylic acids include, but are not limited to, acrylic acid, methacrylic acid, alpha-chloroacrylic acid, alpha-cyanoacrylic acid, beta-methylacrylic acid (crotonic acid), alpha-phenylacrylic acid, beta-acryloxypropionic acid, sorbic acid, alpha-chlorosorbic acid, angelic acid, cinnamic acid, p-chlorocinnamic acid, beta-stearylacrylic acid, itaconic acid, citraconic acid, mesaconic acid, glutaconic acid, aconitic acid, maleic acid, fumaric acid, tricarboxyethylene, maleic anhydride, and mixtures thereof.

Specific examples of suitable monomers containing a glycidyl group are glycidyl (meth)acrylate (i.e., glycidyl methacrylate and glycidyl acrylate), mono- and di-glycidyl itaconate, mono- and di-glycidyl maleate, and mono- and di-glycidyl formate. It also is envisioned that allyl glycidyl ether and vinyl glycidyl ether can be used as the oxirane-functional monomer. A preferred monomer is glycidyl methacrylate ("GMA").

It also should be pointed out that the oxirane-functional vinyl addition polymer can initially be a copolymer of an alpha, beta-unsaturated acid and an alkyl (meth)acrylate, which then is reacted with a glycidyl halide or tosylate, e.g., glycidyl chloride, to position pendant glycidyl groups on the acrylate copolymer. The alpha, beta-unsaturated carboxylic acid can be an acid listed above, for example. In an alternative embodiment, a vinyl addition polymer having pendant hydroxyl groups first is formed. The vinyl addition polymer having pendant hydroxyl groups can be prepared by incorporating a monomer like 2-hydroxyethyl methacrylate or 3-hydroxypropyl methacrylate into the vinyl addition polymer. The polymer then is reacted to position pendant glycidyl groups on the polymer.

The amount of oxirane-functional monomer used to form the oxirane-functional vinyl addition polymer will depend on the desired oxirane functionality and the desired molecular weight of the polymer as well as the weight of the oxirane-functional monomer used. It is presently believed that the oxirane functionality of the formed polymer is suitably at least 0.5, preferably at least 0.9, more preferably at least 1.2, and most preferably at least 1.4. It is presently believed that the oxirane functionality of the formed polymer is suitably at most 5, preferably at most 3, more preferably at most 2.5, and most preferably at most 2. While not intending to be bound by theory, an oxirane functionality above 5 tends to cause premature gellation of the composition and an oxirane functionality below 0.5 tends to be insufficient to promote the desired physical properties.

It is also presently believed that for packaging coating applications, the number average molecular weight ($M_n$) of the oxirane-functional vinyl addition polymer is suitably at least 2,500, preferably at least 4,000, more preferably at least 5,000, and most preferably at least 6,000. It is also presently believed that for packaging coating applications, the number average molecular weight ($M_n$) of the oxirane-functional vinyl addition polymer is suitably at most 20,000, preferably at most 16,000, more preferably at most 12,000, and most preferably at most 8,000.

Using the above oxirane-functionality figures as a guide, and using an oxirane-functional monomer with a molecular weight similar to GMA, for a 7,000 $M_n$ oxirane-functional polymer the amount of oxirane-functional monomer used is suitably at least 1, preferably at least 2, more preferably at least 2.5, and most preferably at least 3 wt. %, based on the weight of the other monomers used to form the polymer. Using the above oxirane-functionality figures as a guide, and using an oxirane-functional monomer with a molecular weight similar to GMA, for a 7,000 $M_n$ oxirane-functional polymer the amount of oxirane-functional monomer used is suitably at most 10, preferably at most 5, more preferably at most 4, and most preferably at most 3.5 wt. %, based on the weight of the other monomers used to form the polymer. If oxirane-functional monomers other than GMA are used, or if the desired molecular weight is different, the amounts may need to be adjusted to account for the different weights.

The oxirane-functional monomer is preferably reacted with suitable other monomers (and optional hydroxy-functional monomers). Suitable other monomers include alkyl (meth)acrylates, vinyl monomers, and the like.

Suitable alkyl (meth)acrylates include those having the structure: $CH_2=C(R^1)-CO-OR^2$ wherein $R^1$ is hydrogen or methyl, and $R^2$ is an alkyl group preferably containing one to sixteen carbon atoms. The $R^2$ group can be substituted with one or more, and typically one to three, moieties such as hydroxy, halo, phenyl, and alkoxy, for example. Suitable alkyl (meth)acrylates therefore encompass hydroxy alkyl (meth)acrylates. The alkyl (meth)acrylate typically is an ester of acrylic or methacrylic acid. Preferably, $R^1$ is hydrogen or methyl and $R^2$ is an alkyl group having two to eight carbon atoms. Most preferably, $R^1$ is hydrogen or methyl and $R^2$ is an alkyl group having two to four carbon atoms. Examples of suitable alkyl (meth)acrylates include, but are not limited to, methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth)acrylate, benzyl (meth)acrylate, lauryl (meth)acrylate, isobornyl (meth)acrylate, octyl (meth)acrylate, and nonyl (meth)acrylate.

Suitable vinyl monomers include styrene, methyl styrene, halostyrene, isoprene, diallylphthalate, divinylbenzene, conjugated butadiene, alpha-methylstyrene, vinyl toluene, vinyl naphthalene, and mixtures thereof. The vinyl aromatic monomers described below in connection with the acid-functional polymer are also suitable for use in this polymer. Styrene is a presently preferred vinyl monomer, in part due to its relatively low cost. Preferred oxirane-functional polymers are prepared from up to 99 wt. %, more preferably up to 80 wt. %, and most preferably up to 70 wt. % vinyl monomer(s), based on the total weight of the monomers. Preferred oxirane-functional polymers are prepared from at least 30 wt. %, more preferably at least 40 wt. %, and most preferably at least 50 wt. % vinyl monomer(s), based on the total weight of the monomers.

Other suitable polymerizable vinyl monomers include acrylonitrile, acrylamide, methacrylamide, methacrylonitrile, vinyl acetate, vinyl propionate, vinyl butyrate, vinyl stearate, isobutoxymethyl acrylamide, and the like.

In preferred embodiments, the polymer is formed using one or more optional hydroxy-functional monomers (e.g., hydroxyethyl acrylate (HEA), hydroxyethyl methacrylate (HEMA), hydroxypropyl (meth)acrylate (HPMA), etc.). Typically, the amount of hydroxy-functional monomer will be selected to achieve the desired hydroxyl-functionality. Preferred oxirane-functional polymers are prepared from at least 10 wt. %, more preferably at least 15 wt. %, and most preferably at least 30 wt. % hydroxy-functional monomer(s) (if used), based on the total weight of the monomers used. Preferred oxirane-functional polymers are prepared from at most 60 wt. %, more preferably at most 50 wt. %, and most preferably at most 45 wt. % hydroxy-functional monomer(s) (if used), based on the total weight of the monomers used.

The aforementioned monomers may be polymerized by standard free radical polymerization techniques, e.g., using initiators such as azoalkanes, peroxides or peroxy esters, to provide an oxirane-functional polymer having a number average molecular weight (Mn) of suitably at least 2,500, preferably at least 4,000, more preferably at least 5,000, and most preferably at least 6,000. The aforementioned monomers may be polymerized by standard free radical polymerization techniques, e.g., using initiators such as azoalkanes, peroxides or peroxy esters, to provide an oxirane-functional polymer having a number average molecular weight (Mn) of suitably at most 20,000, preferably at most 16,000, more preferably at most 12,000, and most preferably at most 8,000.

This reaction may be carried out using suitable solvents, if desired.

In one preferred general embodiment, the oxirane-functional vinyl addition polymer can be prepared from a reaction mixture that includes (by weight) 30 to 70 parts styrene; 3 to 10 parts glycidyl (meth)acrylate; and 30 to 70 parts hydroxyalkyl (meth)acrylate. In one specific embodiment, the oxirane-functional vinyl addition polymer can be prepared from a reaction mixture that includes (by weight) 50 parts styrene; 5 parts GMA; and 45 parts HEMA. In another specific embodiment, the polymer can be prepared from a reaction mixture that includes (by weight) 55 parts styrene; 3 parts GMA; and 42 parts HEMA. These embodiments are illustrative of suitable such oxirane-functional polymers.

It has been discovered that preferred oxirane-functional polymers "mimic" or exceed the properties of traditional "1007-type" epoxy resin (i.e., a resin of the same type as that of RESOLUTION'S EPON 1007 epoxy resin, which has a number average molecular weight of 3,600 to 4,400 and a weight average molecular weight of 12,000 to 16,000); "1009-type" epoxy resin (i.e., a resin of the same type as that of RESOLUTION'S EPON 1009 epoxy resin, which has a number average molecular weight of 4,200 to 5,000 and a weight average molecular weight of 14,000 to 18,000); and "9-A-9-type" epoxy resin (i.e., a resin which is made by reacting a 1009-type epoxy resin with adipic acid, which has a number average molecular weight of 7,000 to 8,000 and a weight average molecular weight of 24,000 to 29,000), without containing or liberating BPA or aromatic glycidyl ether compounds (e.g., BADGE, BFDGE and epoxy novalacs).

Suitable acid-functional polymers include poly-acid or poly-anhydride polymers, e.g., homopolymers or copolymers prepared from ethylenically unsaturated acid or anhydride monomers (e.g., carboxylic acid or carboxylic anhydride monomers) and other optional monomers (e.g., vinyl monomers). It is also anticipated that acid-functional polyester polymers may be utilized.

Preferred acid-functional polymers utilized in this invention include those prepared by conventional free radical polymerization techniques of at least 15 wt. %, more preferably at least 20 wt. %, unsaturated acid-functional monomer and the balance other unsaturated monomer. The choice of the unsaturated monomer(s) is dictated by the intended end use of the coating composition and is practically unlimited. This reaction is conveniently carried out in solution, though other neat processes may be used if desired. Low molecular weight polymers are preferred for certain applications as is discussed herein.

A variety of acid-functional and anhydride-functional monomers can be used; their selection is dependent on the desired final polymer properties. Suitable ethylenically unsaturated acid-functional monomers and anhydride-functional monomers for the present invention include monomers having a reactive carbon-carbon double bond and an acidic or anhydride group. Preferred such monomers have from 3 to 20 carbons, 1 to 4 sites of unsaturation, and from 1 to 5 acid or anhydride groups or salts thereof.

Suitable acid-functional monomers include ethylenically unsaturated acids (mono-protic or diprotic), anhydrides or monoesters of a dibasic acid, which are copolymerizable with the optional other monomer(s) used to prepare the polymer. Illustrative monobasic acids are those represented by the structure $CH_2=C(R^3)—COOH$, where $R^3$ is hydrogen or an alkyl group of 1 to 6 carbon atoms. Suitable dibasic acids are those represented by the formulas $R^4(COOH)C=C(COOH)R^5$ and $R^4(R^5)C=C(COOH)R^6COOH$, where $R^4$ and $R^5$ are hydrogen, an alkyl group of 1-8 carbon atoms, halogen, cycloalkyl of 3 to 7 carbon atoms or phenyl, and $R^6$ is an alkylene group of 1 to 6 carbon atoms. Half-esters of these acids with alkanols of 1 to 8 carbon atoms are also suitable.

Non-limiting examples of useful ethylenically unsaturated acid-functional monomers include acids such as, for example, acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like or mixtures thereof. Preferred unsaturated acid-functional monomers include acrylic acid, methacrylic acid, crotonic acid, fumaric acid, maleic acid, 2-methyl maleic acid, itaconic acid, 2-methyl itaconic acid and mixtures thereof. More preferred unsaturated acid-functional monomers include acrylic acid, methacrylic acid, crotonic acid, fumaric acid, maleic acid, itaconic acid, and mixtures thereof. Most preferred unsaturated acid-functional monomers include acrylic acid, methacrylic acid, maleic acid, crotonic acid, and mixtures thereof.

Non-limiting examples of suitable ethylenically unsaturated anhydride monomers include compounds derived from the above acids (e.g., as pure anhydride or mixtures of such). Preferred anhydrides include acrylic anhydride, methacrylic anhydride, and maleic anhydride. If desired, salts of the above acids may also be employed.

Suitable other monomers include the aforementioned alkyl (meth)acrylates, vinyl monomers, and the like. It is generally preferred that amine-functional monomers be avoided.

Vinyl aromatic monomers are preferably copolymerized with the acid-functional monomers. Suitable such monomers include those represented by the structure: $Ar—C(R^8)=C(R^9)(R^{10})$, where $R^8$, $R^9$, and $R^{10}$ are hydrogen or an alkyl group of 1 to 5 carbon atoms and Ar is a substituted or unsubstituted aromatic group. Illustrative of these monomers are styrene, methyl styrene, vinyl toluene, and the like. The vinyl aromatic monomers can be present from 0-80% of the acid-functional polymer, preferably from 5-50%, and most preferably from 5-40%.

Other commonly utilized monomers are the unsaturated nitriles represented by the structure: $R^{11}(R^{12})C=C(R^{13})—CN$, where $R^{11}$ and $R^{12}$ are hydrogen, an alkyl group of 1 to 18 carbon atoms, tolyl, benzyl or phenyl, and $R^{13}$ is hydrogen or methyl. Most commonly utilized are acrylonitrile and methacrylonitrile. The nitrile monomer can be present from 0-40% based on the acid-functional polymer.

Other suitable monomers are esters of acrylic acid, methacrylic acid or mixtures thereof with C1-C16 alkanols. Preferred esters are the methyl, ethyl, propyl, n-butyl isobutyl, and 2-ethylhexyl esters of acrylic acid or methacrylic acid or mixtures of such esters.

One can also utilize hydroxyalkyl (meth)acrylate monomers such as hydroxyethyl acrylate, hydroxypropyl acrylate, hydroxyethyl methacrylate, hydroxypropyl methacrylate or mixtures thereof.

It may be desirable, for certain uses, to include in the polymer acrylamide, methacrylamide or an N-alkoxymethyl (meth)acrylamide such as N-isobutoxymethyl (meth)acrylamide. Alternatively, a polymer containing copolymerized acrylamide or methacrylamide can be post-reacted with formaldehyde and an alkanol to produce an N-alkoxymethylated polymer.

The acid-functional polymers can be prepared by polymerizing suitable monomers, in proper amounts, in a suitable carrier (e.g., an organic liquid medium). Preferably, the liquid medium for the polymerization is an alcohol mixture. A catalyst or polymerization initiator is ordinarily used in the polymerization of the acid-functional polymers, in the usual amounts. This can be any free radical initiator. Azoalkanes, peroxides, tertiary butyl perbenzoate, tertiary butyl peroxypivalate, and tertiary butyl peroxyisobutyrate are suitable.

Suitable acid-functional polymers have an acid number ("AN") of at least 30, preferably at least 100, more preferably at least 150, and most preferably at least 200, mg KOH/gram solid. Suitable acid-functional polymers have an acid number ("AN") of at most 500, preferably at most 400, more preferably at most 350, and most preferably at most 320, mg KOH/gram solid. For example, 23 weight percent of MAA would provide a polymer of approximately 150 AN.

Suitable acid-functional polymers have a number average molecular weight ($M_n$) of at least 2,000, preferably at least 3,000, more preferably at least 4,000, and most preferably at least 5,000. Suitable acid-functional polymers have a number average molecular weight ($M_n$) of at most 15,000, preferably at most 12,000, more preferably at most 9,000, and most preferably at most 6,000.

In one preferred general embodiment, the acid-functional polymer can be prepared from a reaction mixture that includes (by weight) 5 to 20 parts styrene, 30 to 70 parts alkyl (meth)acrylate, and 30 to 70 parts acidic-functional monomer. In one specific embodiment, the acid-functional polymer can be prepared from a reaction mixture that includes (by weight) 10 parts styrene, 45 butyl methacrylate, and 45 parts MAA. In another specific embodiment, the acid-functional polymer can be prepared from a reaction mixture that includes (by weight) 30 parts styrene, 10 parts ethyl acrylate, and 60 parts MAA. These embodiments are illustrative of suitable such polymers.

The oxirane-functional polymer (or monomers for preparing such polymer) and the acid-functional polymer (or monomers for preparing such polymer) are preferably reacted together in the presence of a tertiary amine and a small amount of water. Under such conditions an acid group, an oxirane group, and an amine form a quaternary salt. This linkage is favored, as it not only links the polymers but promotes water dispersibility of the joined polymer. It should be noted that an acid group and an oxirane group may also form an ester. Some of this reaction is possible, though this linkage is less desirable when water dispersibility is sought.

In one embodiment, an aqueous solution (or dispersion) of a tertiary amine, specified below, is brought in contact with a solution (or dispersion) of an oxirane-functional polymer in a suitable carrier (e.g., a suitable organic liquid) or with a solution (or dispersion) of an oxirane-functional polymer and an acid-functional polymer. A wide variety of carriers can be used to dissolve or disperse (preferably dissolve) the oxirane-functional polymers and the acid-functional polymers. Among the most commonly used carriers are alcohols such as isopropanol, the butyl alcohols, 2-hydroxy-4-methyl-pentane, 2-ethylhexyl alcohol, cyclohexanol, glycols such as ethylene glycol, diethylene glycol, 1,3-butylene glycol, ether alcohols such as ethylene glycol mono-ethyl ether, ethylene glycol mono-butyl ether, diethylene glycol mono-methyl ether, mixtures thereof, and many aliphatic and aromatic hydrocarbons particularly if used admixed with at least one of the above.

While the exact mode of reaction is not fully understood, it is believed that a competition between two reactions exist. One reaction involves the tertiary amine first reacting with the acid-functional polymer forming an amine neutralized ion which can then react with the oxirane-functional polymer. A second reaction may involve the free tertiary amine reacting directly with the oxirane-functional polymer. In either case, the respective products formed are the hydroxy ester of the oxirane-functional polymer with the acid-functional polymer and a polymeric quaternary ammonium-amine mixed salt (from the tertiary amine, oxirane-functional polymer, and the acid-functional polymer). Reaction conditions, including the presence of water as a reaction modifier, can be chosen to favor either the esterification or quaternization reaction. A high level of quaternization improves water dispersability while a high level of esterification gives higher viscosity and possibly gel-like material. By varying the ratio of the reactants and reaction conditions, the solids content, viscosity, particle size and application properties of the product can be varied over a wide range.

The reaction of tertiary amines with materials containing oxirane groups, when carried out in the presence of water, can afford a product that contains both a hydroxyl group and a quaternary ammonium hydroxide.

The preparation of the water-borne coating composition of this invention is preferably carried out utilizing at least one tertiary amine (including, for example, amines having the formula: $R^{14}R^{15}R^{16}N$, wherein $R^{14}$, $R^{15}$ and $R^{16}$ are substituted or unsubstituted monovalent alkyl groups (preferably containing 1 to 8 carbon atoms, and more preferably containing 1 to 4 carbon atoms).

Some examples of suitable tertiary amines are trimethyl amine, dimethyl ethanol amine (also known as dimethyl amino ethanol), methyl diethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine and mixtures thereof.

Other examples of tertiary amines are disclosed, for example, in U.S. Pat. Nos. 6,300,428; 6,087,417; 4,247,439; 5,830,952; 4,021,396; 5,296,525; 4,480,058; 4,442,246; 4,446,258; and 4,476,262, which are herein incorporated by reference.

Most preferably trimethyl amine or dimethyl ethanol amine is used as the tertiary amine.

The amount of tertiary amine needed in the preparation of the water-borne coating composition of this invention is determined by various factors. As a minimum, there is required at least 0.8 equivalent of tertiary amine per equivalent of oxirane groups, preferably at least 2 equivalents, more preferably at least 3 equivalents, of tertiary amine per equivalent of oxirane groups for the formation of stable dispersions. As the ratio of the number of acid groups in the acid-functional polymer to the number of oxirane groups in the oxirane-functional polymer increases, the amount of amine is also increased to keep the acid-functional polymer water dispersible. This excess amine is believed to form a salt with some or all of the excess acid groups of the polymer. It is preferred that no excess amine, over the total number of equivalents of acid groups, be used in the coating composition of this invention.

It has been discovered that the stoichiometric ratio of amine to oxirane (A:Ox) can influence the viscosity of the composition. In general as the A:Ox ratio increases, viscosity decreases. It should be noted that this trend may not always be true as dispersion conditions have been found to also impact viscosity. Preferably the A:Ox ratio is at least 0.8:1, more preferably at least 2:1, and most preferably at least 2.5:1. Preferably the A:Ox ratio is at most 5:1, more preferably at most 4:1, and most preferably at most 3.5:1. Additional amine may be added after the polymer has been dispersed to further adjust viscosity.

The weight ratio of oxirane-functional polymer to acid-functional polymer is typically at least 90:10, preferably at least 87:13, and more preferably at least 84:16. The weight ratio of oxirane-functional polymer to acid-functional polymer is typically at most 50:50, preferably at most 70:30, and more preferably at most 80:20.

The water-borne coating composition of this invention can be prepared without regard to the sequence of addition of the various components. Although it is preferred that the water-dispersible polymer is prepared from preformed polymers (e.g., oxirane-functional vinyl addition polymer and acid-functional polymer), it is possible that monomers for one of the polymers can be reacted with the other polymer that is either preformed or formed in-situ. If desired, an acid-functional polymer can be combined with a tertiary amine to at least partially neutralize the acid-functional polymer prior to reaction with the an oxirane-functional polymer or monomers for formation of an oxirane-functional polymer.

It is preferred, however, to first dissolve the oxirane-functional polymer in the acid-functional polymer, in presence of suitable carriers (e.g., organic liquids). Addition of a suitable tertiary amine, usually dissolved in water, completes the preparation of the polymeric quaternary ammonium salt of a polymeric acid. Additional water can then be added to achieve an aqueous dispersion. Additional amine can also be added to insure dispersibility or adjust viscosity.

Preferably, the reaction can be carried out at a temperature of at least room temperature (e.g., 25° C.), more preferably at least 50° C., and most preferably at least 90° C. Preferably, the reaction can be carried out at a temperature of below the boiling point of the reaction medium, and more preferably at a temperature of at most 100° C. In this temperature range there is a rapid rate of reaction.

In another preferred method of preparation of the coating composition, an oxirane-functional polymer is dissolved in a suitable carrier such as the mono-butyl ether of ethylene glycol or diethylene glycol, followed by the addition of a suitable tertiary amine. After the formation of the polymeric quaternary ammonium hydroxide is substantially complete, an acid-functional polymer, dissolved or dispersed in a suitable carrier is mixed with it with agitation. This latter solution or dispersion can also contain any additional suitable amine, dissolved in water, necessary for dispersability of the coating composition. Mixing of the components completes the preparation of the water-borne coating composition. This sequence of steps can also be carried out between room temperature and temperatures below the boiling point of the reaction media.

The resultant product is a cured film that includes a crosslinked polymer having a crosslink segment of the general formula:

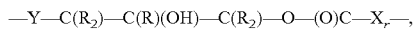

wherein: Y is a divalent organic group (preferably a C1 to C6 organic group), more preferably a divalent organic group that includes a C(O)O moiety; X is a divalent organic group (preferably a C1 to C6 organic group); R is H, or a C1 to C6 organic group, preferably H; and r is 0 or 1, preferably 0.

It has been discovered that coating compositions using the aforementioned dispersions may be formulated using one or more optional curing agents (i.e., crosslinking resins, sometimes referred to as "crosslinkers"). The choice of particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of mobile BPA and aromatic glycidyl ether compounds (e.g., BADGE, BFDGE and epoxy novalacs).

Any of the well known hydroxyl-reactive curing resins can be used. For example, phenoplast and aminoplast curing agents may be used.

Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine and benzoguanamine.

Examples of suitable crosslinking resins include, without limitation: benzoguanamine-formaldehyde resins, melamine-formaldehyde resins, esterified melamine-formaldehyde, and urea-formadehyde resins. Preferably, the crosslinker employed when practicing this invention comprises a melamine-formaldehyde resin. One specific example of a particularly useful crosslinker is the fully alkylated melamine-formaldehyde resin commercially available from Cytec Industries, Inc. under the trade name of CYMEL 303.

As examples of other generally suitable curing agents are the blocked or non-blocked aliphatic, cycloaliphatic or aromatic di-, tri-, or poly-valent isocyanates, such as hexamethylene diisocyanate, cyclohexyl-1,4-diisocyanate, and the like.

The level of curing agent (i.e., crosslinker) required will depend on the type of curing agent, the time and temperature of the bake, and the molecular weight of the polymer. The crosslinker is typically present in an amount of at least 5% by weight (wt. %), preferably at least 10% by weight, and more preferably at least 15% by weight. The crosslinker is typically present in an amount of at most 50% by weight, preferably at most 40% by weight, and more preferably at least 30% by weight. These weight percentages are based upon the total weight of the resin solids in the coating composition.

A coating composition of the present invention may also include other optional polymers that do not adversely affect the coating composition or a cured coating composition resulting therefrom. Such optional polymers are typically included in a coating composition as a filler material, although they can be included as a crosslinking material, or to provide desirable properties. Preferred optional polymers are substantially free of mobile BPA and aromatic glycidyl ether compounds (e.g., BADGE, BFDGE and epoxy novalacs)

Such additional polymeric materials can be nonreactive, and hence, simply function as fillers. Alternatively, such additional polymeric materials or monomers can be reactive with the water-dispersible polymer, the oxirane-functional polymer, and/or the acid-functional polymer. If selected properly, such polymers and/or monomers can be involved in crosslinking.

One or more optional polymers or monomers (such as those used for forming such optional polymers), can be added to the composition after the water-dispersible polymer is dispersed in a carrier. Alternatively, one or more optional polymers or monomers (such as those used for forming such polymers), can be added to a reaction mixture at various stages of the reaction (i.e., before the water-dispersible polymer is dispersed in a carrier).

For example, a nonreactive filler polymer can be added after dispersing the water-dispersible polymer in the carrier. Alternatively, a nonreactive filler polymer can be added before dispersing the water-dispersible polymer in the carrier, which can be before, during, or after reacting the oxirane-functional vinyl addition polymer and the acid-functional vinyl addition polymer together in the presence of a tertiary amine.

Such optional nonreactive filler polymers include, for example, polyesters, acrylics, polyamides, polyethers, and novalacs.

If desired, reactive polymers can be incorporated into the compositions of the present invention, to provide additional functionality for various purposes, including crosslinking.

Examples of such reactive polymers include, for example, functionalized polyesters, acrylics, polyamides, and polyethers.

One or more optional polymers (e.g., filler polymers) can be included in a sufficient amount to serve an intended purpose, but not in such an amount to adversely affect a coating composition or a cured coating composition resulting therefrom.

A coating composition of the present invention may also include other optional ingredients that do not adversely affect the coating composition or a cured coating composition resulting therefrom. Such optional ingredients are typically included in a coating composition to enhance composition esthetics, to facilitate manufacturing, processing, handling, and application of the composition, and to further improve a particular functional property of a coating composition or a cured coating composition resulting therefrom.

Such optional ingredients include, for example, catalysts, dyes, pigments, toners, extenders, fillers, lubricants, anticorrosion agents, flow control agents, thixotropic agents, dispersing agents, antioxidants, adhesion promoters, light stabilizers, and mixtures thereof. Each optional ingredient is included in a sufficient amount to serve its intended purpose, but not in such an amount to adversely affect a coating composition or a cured coating composition resulting therefrom.

One optional ingredient is a catalyst to increase the rate of cure. If used, a catalyst is preferably present in an amount of at least 0.05%, and more preferably at least 0.1%, by weight of nonvolatile material. If used, a catalyst is preferably present in an amount of at most 1%, and more preferably at most 0.5%, by weight of nonvolatile material.

Examples of catalysts, include, but are not limited to, strong acids (e.g., dodecylbenzene sulphonic acid (ddbsa, available as CYCAT 600), methane sulfonic acid (msa), p-toluene sulfonic acid (ptsa), dinonylnaphthalene disulfonic acid (dnndsa), and triflic acid), quaternary ammonium compounds, phosphorous compounds, and tin and zinc compounds, like a tetraalkyl ammonium halide, a tetraalkyl or tetraaryl phosphonium iodide or acetate, tin octoate, zinc octoate, triphenylphosphine, and similar catalysts known to persons skilled in the art.

Another useful optional ingredient is a lubricant, like a wax, which facilitates manufacture of metal closures by imparting lubricity to sheets of coated metal substrate. A lubricant is preferably present in the coating composition in an amount of 0 to 2%, and preferably 0.1 to 2%, by weight of nonvolatile material. Preferred lubricants include, for example, Carnauba wax and polyethylene type lubricants.

Another useful optional ingredient is a pigment, like titanium dioxide. A pigment, like titanium dioxide, is optionally present in the coating composition in an amount of 0 to 70 wt. %, more preferably 0 to 50 wt. % and most preferably 0 to 40 wt. %, based on the total weight of solids in the coating composition.

The aforementioned coating composition is particularly well adapted for use as a coating for packaging articles (e.g., two-piece cans, three-piece cans, etc.). Two-piece cans are manufactured by joining a can body (typically a drawn metal body) with a can end (typically a drawn metal end). The coatings of the present invention are suitable for use in food contact situations and may be used on the inside of such cans As described in previous sections, the present invention is demonstrated to possess a high degree of utility as a spray applied, liquid coating for the interior of two-piece drawn and ironed tinplate food cans (hereinafter "tinplate D&I cans"). The present invention also offers utility in other applications. These additional applications include, but are not limited to: wash coating, coil coating, sheet coating, and side seam coatings, e.g., food can side seam coatings.

A wash coating is commercially described as the coating of the exterior of two-piece drawn and ironed ("D&I") cans with a thin layer of protectant coating. The exterior of these D&I cans are 'wash-coated' by passing pre-formed two-piece D&I cans under a curtain of coating. The cans are inverted, that is the open end of the can is in the 'down' position when passing through the curtain. This curtain of coating takes on a 'waterfall-like' appearance. Once these cans pass under this curtain of coating, the liquid coating material effectively coats the exterior of each can. Excess coating is removed through the use of an 'air knife.' Once the desired amount of coating is applied to the exterior of each can, each can is passed through a thermal and/or ultraviolet and/or electromagnetic curing oven to dry and cure the coating. The residence time of the coated can within the confines of the curing oven is 1-5 minutes. The curing temperature within this oven will range between 150-220° C.

A coil coating is described as the coating of a continuous coil composed of a metal (e.g., steel or aluminum). Once coated, the coating coil is subjected to a short thermal, and/or ultraviolet and/or electromagnetic curing cycle, which lead to the drying and curing of the coating. Coil coatings provide coated metal (e.g., steel and/or aluminum) substrates that can be fabricated into formed articles such as 2-piece drawn food cans, 3-piece food cans, food can ends, drawn and ironed cans, beverage can ends and the like.

A sheet coating is described as the coating of separate pieces of a variety of materials (e.g., steel or aluminum) that have been pre-cut into square or rectangular 'sheets'. Typical dimensions of these sheets are approximately one square meters. Once coated, each sheet is cured. Once dried and cured, the sheets of the coated substrate are collected and prepared for subsequent fabrication. Coil coatings provide coated metal (e.g., steel or aluminum) substrate that can be successfully fabricated into formed articles such as 2-piece drawn food cans, 3-piece food cans, food can ends, drawn and ironed cans, beverage can ends and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed 'weld' from subsequent corrosion or other effects to the contained foodstuff. The liquid coatings that function in this role are termed 'side seam stripes'. Typical side seam stripes are spray applied and cured quickly via residual heat from the welding operation in addition to a small thermal and/or ultraviolet and/or electromagnetic oven.

Other commercial coating application and curing methods are also envisioned, for example, electrocoating, extrusion coating, laminating, powder coating, and the like. In one presently preferred embodiment, the coating composition is adapted for food contact situations and has 24 wt. % to 30 wt. % solids, and less than 0.36 kg/liter (3 pounds/gallon) VOC.

EXAMPLES

The following examples are offered to aid in understanding of the present invention and are not to be construed as limiting the scope thereof. Unless otherwise indicated, all parts and percentages are by weight. The constructions cited were evaluated by tests as follows:
Coating Uniformity/Metal Exposure:

This test method determines the amount the inside surface of the can that has not been effectively coated by the sprayed coating. This determination is made thorough the use of an electrically conductive solution (1% NaCl in Deionized water). The coated can is filled with this conductive solution. An electrical probe is attached in contact to the outside of the can (uncoated, electrically conducting) and a second probe is immersed in the salt solution in the middle of the inside of the can. If any uncoated metal is present on the inside of the can, then a current is passed between these two probes and registers as a value on an LED display. The LED displays the conveyed currents in milliamps, or more commonly referred to as 'mAs'. The current that is passed is directly proportional to the amount of metal that has not been effectively covered with coating. The goal is to achieve 100% coating coverage on the inside of the can, which would result in an LED reading of 0.0 mAs. Commercial acceptable metal exposure values are typically less than 3.0 mAs on average.
Coating Spreadability/Wetting:

This test is essentially a visual assessments of a coating's ability to effectively 'wet' or spread evenly across the inside surface of the sprayed can. It is desired for the sprayed coating to spread evenly without visual defects such as eyeholes, creeping, crawling or others, which may result in higher metal exposure value or other visually objectionable phenomena. A rating of excellent is believed to indicate that a can is of commercially acceptable quality. The rating scale is verbal and is defined as follows: Excellent: No visual defects; Good: Very few, minimal defects; Fair: Few significant defects; Poor: Frequent occurrence of significant defects.
Blistering:

This test is essentially a visual inspection of a coatings tendency to 'blister' or form undesirable air bubbles in location the inside of the sprayed can. It is commercially undesirable for the coating on the inside of a can to possess visible blistering. As such a blister rating of 'Excellent' indicates cans that are believed to be of commercial quality. The rating scale is verbal and is defined as follows:

Excellent: No visual blistering; Good: Very few, small blisters; Fair: Frequent occurrence of small blisters; Poor: Frequent occurrence of large blisters.

Cured Film Performance:

There are a wide variety of food products that are 'packed' commercially within coated, tinplate D&I cans. For coating research and development purposes, several coating 'screening tests' have been developed to help predict whether or not a coating possesses the required staining, adhesion and corrosion performance to function acceptably as an interior lacquer for commercially prepared and packed D&I tinplate cans. Of particular interest is the coating's performance under food sterilization cycles, more commonly referred to as 'food retorts'. This retort is a thermal sterilization of the packed can that is conducted in superheated and pressurized steam and/or water.

Typical commercial sterilization retorts pass packed food cans through superheated steam or water for a time period ranging from 10 minutes up to several (1-3) hours, depending on factors such as the can size and the food product of interest. The temperature of the steam or water is approximately 121° C. It is under these retort conditions that the can's interior coating can begin to fail in coating performances such as stain resistance, adhesion or corrosion resistance. The function of the interior coating is to provide protection of the can from the packed product (corrosion, staining resistance) as well as to protect the packed product from the can (metal exposure, adhesion). It is commercially undesirable for the D&I can's internal coating to show dramatic failures in these areas under packing, sterilization or storage conditions. As such, a testing protocol has been effectively developed to predict the commercial performance of any prospective new D&I can interiors.

Of particular interest is the 'headspace' area of the can where the performance requirements tend to be the most difficult. The headspace is the small area at the top of the can (typically 0.5-1.0 cm) in which there is no food product. The headspace is left for each can to allow for expansion of the product during retorting, without explosion of the can by the pressure of its contents. Additional evaluations were sometimes made at the dome and bead sections of the cans.

In order to conduct this evaluation, a sufficient number of test cans are prepared using the coating variables, which are to be tested. Once the cans are completely coated with the coatings of interest, several food product test media are selected to conduct the food product resistance testing. For the gold variables, the products selected are representative of a long list of products that are typically commercially packed in gold D&I cans. Once the actual food products are selected, they are filled within the can body at the temperatures which are employed commercially. One should consult a commercial canning guide for more details or reference. Typically each can is filled to within 1.25 cm (headspace) to allow for expansion of the product during retort. Once filled, each can is appropriately closed through the double seaming of an appropriate diameter food can end. Once seamed, the cans are given the retort sterilization cycle (time, temperature) in accordance with commercial practices. Following the retort sterilization, the cans are adequately cooled and opened with a conventional, hand operated can opener. Once opened, the contents are emptied, the inside of the can is rinsed with clean water, the can is cut in four places laterally down the sidewall and the 'flattened' can is adequately dried. At this stage the cans are ready for the following film evaluations:

Adhesion:

The headspace region of the can is 'cross-hatched' in a 'tic tac toe-like' pattern with a sharp object. Once this crosshatch pattern is made this region is investigated with Scotch® #610 tape to assess the ability of the coating to maintain adhesion in this area. The adhesion rating scale is 0-10, with '10' meaning that 100% of the coating in this area has maintained adhesion. A '0' is issued when 100% of the coating in this region is removed by the tape. The adhesion rating reported is an average rating of three cans.

Corrosion:

The headspace are of the can is visibly analyzed for the occurrence of obvious corrosion. The rating scale for corrosion is also 0-10 with a '10' indicating that there is no occurrence of visible occurrence and a '0' indicating that 100% of the headspace area is showing corrosion. The corrosion rating reported is an average rating of three cans.

The following are the fill and retort conditions used:
1. Creamed corn pre-heated to 71° C. prior to the filling and closure of the can. Retort conditions 1.5 hours at 121° C.
2. Carrots in Brine: Brine Solution pre-heated to 88° C. prior to the filling and closure of the can. Retort conditions 1.5 hours at 121° C.
3. Green beans filled at room temperature. Retort conditions 1.5 hours at 121° C.
4. Spinach pre-heated to 88° C. prior to the filling and closure of the can. Retort conditions 1.5 hours at 121° C.
5. Chicken broth pre-heated to 82° C. prior to the filling and closure of the can. Retort conditions 1.5 hours at 121° C.
6. Tomatoes pre-heated to 88° C. prior to the filling and closure of the can. Retort conditions 1.5 hours at 121° C.
7. Peas pre-heated to 71° C. prior to the filling and closure of the can. Retort conditions 1.5 hours at 121° C.

Example 1

Preparation of Oxirane-Functional Polymers

Example 1, Run 1

A 5-liter flask was equipped with a stirrer, reflux condenser, thermocouple, heating mantle and nitrogen blanket. In a separate vessel a monomer premix containing 1162 parts styrene, 888 parts hydroxy ethyl methacrylate, 64.1 parts glycidyl methacrylate, and 90.4 parts t-butyl peroctoate was prepared. To the 5-liter flask was added 245 parts butanol and 804 parts butyl cellosolve. The flask was heated to 97° C., and 14.2 parts t-butyl peroctoate was added. After 5 minutes the premix was added to the flask over two and a half hours while maintaining 97° C. to 101° C. An initiator premix comprising 105 parts butyl cellosolve and 45.1 parts t-butyl peroctoate was prepared. When the monomer premix addition was complete, the premix vessel was rinsed with 43 parts butyl cellosolve. The initiator premix was immediately added over a one hour period. When the initiator premix addition was complete, the vessel was rinsed with 27 parts butyl cellosolve. The batch was held at 98° C. to 99° C. for one hour. At the end of the hour 4.34 parts t-butyl peroctoate was added and the batch was held one hour. At the end of the hour a second addition of 4.34 parts t-butyl peroctoate was added and the batch was held an additional one hour. At the end of the hour a third addition of 4.34 parts t-butyl peroctoate was added and the batch was held one hour. The batch was then cooled and yielded a polymer with 62.5% NV, an oxirane value of 0.018 eq/100 gram solid resin, an acid number of 2.6, and a viscosity of 210,000 centipoise at 26.7° C.

An additional batch made following the above procedure provided a polymer having 62.6% NV, an oxirane value of 0.019, an acid number of 2.5 and a viscosity of 222,000 centipoise. A second additional batch provided a polymer having 64.8% NV, an oxirane value of 0.019, an acid number of 1.8 and a viscosity of 268,000 centipoise.

Example 1, Run 2

A 5-liter flask was equipped with a stirrer, reflux condenser, thermocouple, heating mantle and nitrogen blanket. In a separate vessel a monomer premix containing 1162 parts styrene, 888 parts hydroxy ethyl methacrylate, 64.1 parts glycidyl methacrylate, and 90.4 parts t-butyl peroctoate was prepared. To the 5-liter flask was added 524.5 parts butanol and 524.5 parts butyl cellosolve. The flask was heated to 98° C., and 14.2 parts t-butyl peroctoate was added. After 5 minutes the premix was added to the flask over two and a half hours while maintaining 97° C. to 101° C. An initiator premix comprising 105 parts butyl cellosolve and 45.1 parts t-butyl peroctoate was prepared. When the monomer premix addition was complete, the premix vessel was rinsed with 43 parts butyl cellosolve. The initiator premix was immediately added over a one hour period. When the initiator premix addition was complete, the vessel was rinsed with 27 parts butyl cellosolve. The batch was held at 98° C. to 99° C. for one hour. At the end of the hour 4.34 parts t-butyl peroctoate was added and the batch was held one hour. At the end of the hour a second addition of 4.34 parts t-butyl peroctoate was added and the batch was held an additional one hour. At the end of the hour a third addition of 4.34 parts t-butyl peroctoate was added and the batch was held one hour. The batch was then cooled and yielded a polymer with 62.3% NV, an oxirane value of 0.020 eq/100 gram solid resin, and a viscosity of 183,000 centipoise at 26.7° C.

Additional batches were produced using the above process and provided polymers having 62.4% NV, 0.018 to 0.019 oxirane value and 166,000 to 175,200 centipoise.

Example 1, Run 3

A 12-liter flask was equipped with a stirrer, reflux condenser, thermocouple, heating mantle and nitrogen blanket. In a separate vessel a monomer premix containing 1726.1 parts styrene, 1319.2 parts hydroxy ethyl methacrylate, 95.2 parts glycidyl methacrylate, and 134.3 parts t-butyl peroctoate was prepared. To the 12-liter flask was added 363.9 parts butanol and 1194.3 parts butyl cellosolve. The flask was heated to 98° C., and 21.0 parts t-butyl peroctoate was added. After 5 minutes the premix was added to the flask over three and a half hours while maintaining 97° C. to 101° C. An initiator premix of 156 parts butyl cellosolve and 67 parts t-butyl peroctoate was prepared. When the monomer premix addition was complete, the premix vessel was rinsed with 63.9 parts butyl cellosolve. The initiator premix was immediately added over a one hour period. When the initiator premix addition was complete, the vessel was rinsed with 39.6 parts butyl cellosolve. The batch was held at 98° C. to 99° C. for one hour. At the end of the hour 6.5 parts t-butyl peroctoate was added and the batch was held one hour. At the end of the hour a second addition of 6.5 parts t-butyl peroctoate was added and the batch was held an additional one hour. At the end of the hour a third addition of 6.5 parts t-butyl peroctoate was added and the batch was held one hour. The batch was then cooled and yielded a polymer with 64.5% NV, an oxirane value of 0.018 eq/100 gram solid resin, and an acid number of 3.3.

A repeat batch provided a polymer having 64.2% NV, an oxirane value of 0.017 eq/100 gram solid resin, an acid number of 2.2, and a Brookfield viscosity of 216,400 centipoise.

Example 1, Run 4

A 12-liter flask was equipped with a stirrer, reflux condenser, thermocouple, heating mantle and nitrogen blanket. In a separate vessel a monomer premix containing 1412.4 parts styrene, 1079.4 parts hydroxy propyl methacrylate, 77.9 parts glycidyl methacrylate, and 109.9 parts t-butyl peroctoate was prepared. To the 12-liter flask was added 297.8 parts butanol and 967.3 parts butyl cellosolve. The flask was heated to 94° C., and 17.3 parts t-butyl peroctoate was added. After 5 minutes the premix was added to the flask over three and a half hours while maintaining 97° C. to 100° C. An initiator premix of 127.7 parts butyl cellosolve and 54.8 parts t-butyl peroctoate was prepared. When the monomer premix addition was complete, the premix vessel was rinsed with 52.3 parts butyl cellosolve. The initiator premix was immediately added over a one-hour period. When the initiator premix addition was complete, the vessel was rinsed with 32.4 parts butyl cellosolve. The batch was held at 98° C. to 99° C. for one hour. At the end of the hour 5.3 parts t-butyl peroctoate was added and the batch was held one hour. At the end of the hour a second addition of 5.3 parts t-butyl peroctoate was added and the batch was held an additional one hour. At the end of the hour a third addition of 5.3 parts t-butyl peroctoate was added and the batch was held one hour. The batch was then cooled and yielded an acrylic prepolymer with 63.6% NV, an oxirane value of 0.021 eq/100 gram solid resin, an acid number of 2.0, and a Brookfield viscosity of 89,900 centipoise.

Example 2

Preparation of Acid-Functional Polymers

Example 2, Run 1

A premix of 163.6 parts glacial methacrylic acid, 163.6 butyl methacrylate, 36.4 parts styrene, and 23.4 parts benzoyl peroxide (70% water wet) was prepared in a separate vessel. A 1-liter flask was equipped with a stirrer, reflux condenser, thermocouple, heating mantle and nitrogen blanket. Ten percent of the premix was added to the flask along with 129.6 parts butanol and 9.8 parts deionized water. To the remaining premix was added 183.0 parts butanol and 12.2 parts deionized water. With a nitrogen blanket flowing in the flask, the contents were heated to 93° C. When the contents reached 93° C., external heating was stopped and the material was allowed to increase in temperature for fifteen minutes. After fifteen minutes, the batch was at 97° C., and the remaining premix was added uniformly over two hours maintaining 97° C. to 100° C. Foaming was controlled by lowering the agitation. After three hours the heating was discontinued and 75 parts butyl cellosolve was added. The resulting acrylic prepolymer was 44.9% NV, with an acid number of 300 and a viscosity of 24,000 centipoise.

Two additional batches were produced using the same process. The first additional batch provided a polymer having 44.7% NV, 304 acid number and a viscosity of 30,100 centipoise. The second additional batch provided a polymer having 44.7% NV, 306 acid number and a viscosity of 27,500 centipoise.

Example 2, Run 2

A premix of 512.6 parts glacial methacrylic acid, 512.6 butyl acrylate, 114.0 parts styrene, and 73.2 parts benzoyl peroxide (70% water wet) was prepared in a separate vessel. A 3-liter flask was equipped with a stirrer, reflux condenser, thermocouple, heating mantle and nitrogen blanket. Ten percent of the premix was added to the flask along with 405.9 parts butanol and 30.6 parts deionized water. To the remaining premix was added 496.1 parts butanol and 38.3 parts deionized water. With the nitrogen blanket flowing in the flask, the contents was heated to 93° C. When the contents reached 93° C., external heating was stopped and the material was allowed to increase in temperature for fifteen minutes. After fifteen minutes, the batch was at 97° C., and the remaining premix was added uniformly over two hours maintaining 97° C. to 100° C. When the premix addition was complete, the premix vessel was rinse with 5 parts butanol. The batch was held at temperature for two and a half hours. The heating was discontinued and 317.7 parts butyl cellosolve was added. The resulting acrylic prepolymer was 44.4% NV, with an acid number of 314 and a viscosity of 5,080 centipoise.

Example 3

Preparation of Dispersion

Example 3, Run 1

A 3-Liter flask was equipped as describe above. Into the flask was added 894.6 parts of the acrylic prepolymer in Example 1, Run 2, 277.3 parts of the prepolymer in Example 2, Run 1, and 13.7 parts deionized water. The contents of the flask were heated to 99° C. Once at temperature, 30.3 parts dimethyl ethanol amine was added over five minutes. The batch was held for four hours at 96° C. to 99° C. At the end of the four hours, heating was stopped, 1036 parts deionized water was added at high agitation over one hour and fifteen minutes while the temperature was allowed to decrease. The resulting dispersion was 30.4% NV, particle size of 0.25 micron, pH of 6.75, acid number of 49.3, and had a Brookfield viscosity of 307 centipoise.

Example 3, Run 2

Using the process outline in Example 3, Run 1, 881 parts of the acrylic prepolymer in Example 1, Run 2, 273.1 parts of the prepolymer in Example 2, Run 2, 13.5 parts deionized water, 29.8 parts dimethyl ethanol amine, and 1020 parts deionized water was used to prepare a dispersion. The dispersion had 30.3% NV, a particle size of 0.21 micron, a pH of 6.96, and a Brookfield viscosity of 3,700 centipoise.

A repeat batch had 30.4% NV, a 0.22 micron particle size and a 7,500 centipoise viscosity.

Example 3, Run 3

Using the process outline in Example 3, Run 1, 1417 parts of the acrylic prepolymer in Example 1, Run 2, 434.8 parts of the prepolymer in Example 2, Run 1, 21.5 parts deionized water, 47.5 parts dimethyl ethanol amine, and 945 parts deionized water was used to prepare a dispersion. The dispersion had 37.8% NV, a particle size of 0.25 micron, a pH of 6.71, an acid number of 47.1, and a Brookfield viscosity of 14,300 centipoise.

A repeat batch had 37.7% NV, a 0.29 micron particle size, an acid number of 50.0, and a 16,600 centipoise viscosity. A third batch had 37.8% NV, a 0.29 micron particle size, an acid number of 50.2, and a 16,600 centipoise viscosity.

Example 3, Run 4

Using the process outline in Example 3, Run 1, 1672 parts of the acrylic prepolymer in Example 1, Run 1, 513 parts of the prepolymer in Example 2, Run 1, 25.4 parts deionized water, 56.0 parts dimethyl ethanol amine, and 1115.1 parts deionized water was used to prepare a dispersion. The dispersion had 37.9% NV, a particle size of 0.30 micron, an acid number of 50.2, and a Brookfield viscosity of 8,270 centipoise.

A first repeat batch had 37.3% NV, a particle size of 0.25 micron, an acid number of 50.2, and a Brookfield viscosity of 8,150 centipoise. A second repeat batch had 37.9% NV, a particle size of 0.29 micron, an acid number of 49.2, and a Brookfield viscosity of 15,580 centipoise Example 3, Run 5

Using the process outline in Example 3, Run 1, 4920.6 parts of the acrylic prepolymer in Example 1, Run 3, 1509.3 parts of the prepolymer in Example 2, Run 1, 74.8 parts deionized water, 164.6 parts dimethyl ethanol amine, and 3280.7 parts deionized water was used to prepare a dispersion. The dispersion had 38.2% NV, a particle size of 0.31 micron, a pH of 6.84, and a Brookfield viscosity of 27,500 centipoise.

A repeat batch had 38.0% NV, a particle size of 0.34 micron, a pH of 6.91, and a Brookfield viscosity of 32,000 centipoise.

Example 3, Run 6

A 12-Liter flask was equipped as describe above. Into the flask was added 4740.4 parts of the acrylic prepolymer in Example 1, Run 3 and 1454 parts of the prepolymer in Example 2, Run 1. The contents of the flask were heated to 98° C. Once at temperature, 72 parts deionized water and 158.6 parts dimethyl ethanol amine was added over five minutes. The batch was held for three and a half hours at 99 to 100° C. At the end of the three and a half hours, 791.1 parts Rutaphen 9989 LB (60% solid phenolic solution from Bakelite AG), 401.1 parts Santolink EP 560 (80% solids Phenolic solution from Solutia), and 326 parts Varcum 2227-B-55 (55% solids phenolic solution from Reichhold) was added with the temperature adjusted to 90° C. to 95° C. The batch was held for 30 minutes. Heating was stopped and 3160.6 parts deionized water was added at high agitation over three hours while the temperature was allowed to decrease. The next day an additional 2963 parts deionized water was added. The resulting dispersion had 37.5% NV and a pH of 7.21.

Example 3, Run 7

A 12-Liter flask was equipped as describe above. Into the flask was added 4072.2 parts of the acrylic prepolymer in Example 1, Run 4 and 1249.3 parts of the prepolymer in Example 2, Run 1. The contents of the flask were heated to 97° C. Once at temperature, 61.8 parts deionized water and 136.3 parts dimethyl ethanol amine was added over five minutes. The batch was held for four hours at 99° C. to 100° C. At the end of the four hours, heating was stopped and 2715.2 parts deionized water was added at high agitation over two hours while the temperature was allowed to decrease. Immediately after the addition, 400 parts of deionized water was added over fifteen minutes. The resulting dispersion was 36.9% NV, particle size of 0.29 micron, pH of 6.84, acid number of 56.6, and a Brookfield viscosity of 6320 centipoise.

Example 4

Preparation of Paste Compositions

Example 4, Run 1

In a container was mixed 481.1 parts Example 3, Run 3, 518.9 parts Zinc Oxide pigment, 130 parts deionized water, 33 parts butyl cellosolve, and 85.3 parts butyl carbitol. Once uniform the contents were placed into a sand mill and ground until a fineness of grind of >7 was achieved.

Example 4, Run 2

In a suitable container 383.8 parts Example 3, Run 4, 416.2 parts Zinc Oxide pigment, and 170.0 parts butyl carbitol is mixed. Once uniform the contents were placed into a sand mill and ground until a fineness of grind of >7.5 was achieved.

Example 4, Run 3

A white paste containing $TiO_2$ pigment was prepared by mixing 125 parts Example 3, Run 3, with 46.6 parts deionized water, 0.5 parts dimethyl ethanol amine, 5 parts butyl cellosolve, and 250 parts $TiO_2$ pigment. The mixture was then agitated with a Hockmeyer blade to achieve a grind. Once the grind was achieved the material was reduced with 40 parts Example 3, Run 3, 28 parts deionized water and 0.8 parts dimethyl ethanol amine.

Example 4, Run 4

In a suitable container 378.15 parts Example 3, Run 5, with 98.4 parts deionized water, 1.5 parts dimethyl ethanol amine, 756.15 parts TiO$_2$ pigment, 15.15 part butyl cellosolve, and 42.6 parts deionized water were mixed with a Hockmeyer blade. Once a grind is achieved the material was reduced with 121.05 parts Example 3, Run 5, 84.6 parts deionized water and 1.0 parts dimethyl ethanol amine.

Example 4, Run 5

In a suitable container 60 parts 3610HVL coating (available from The Valspar Corporation) and 40 parts Zinc Oxide pigment was mixed. Once uniform the contents were placed into a sand mill and ground until a fineness of grind of >7.5 was achieved.

Example 4, Run 6

In a suitable container 1238.4 parts Example 3, Run 4, 1288.4 parts Zinc Oxide pigment, and 522.2 parts butyl carbitol is mixed. Once uniform the contents were placed into a sand mill and ground until a fineness of grind of >7 was achieved.

Example 4, Run 7

In a suitable container 1471.5 parts Example 3, Run 6, with 277.9 parts deionized water, 5.5 parts dimethyl ethanol amine 2776.1 parts TiO$_2$ pigment, 55.7 part butyl cellosolve, and 156.4 parts deionized water were mixed with a Hockmeyer blade. Once a grind is achieved the material was reduced with 470.9 parts Example 3, Run 6, 284.1 parts deionized water and 1.8 parts dimethyl ethanol amine.

Example 5

Preparation of Gold Coating Compositions

Example 5, Run 1

In a glass quart jar with a plastic stir propeller was mixed 715 parts of Example 3, Run 1. Under agitation 44.2 parts Rutaphen 9989 LB, 22.5 parts Santolink EP 560, 18.2 parts Varcum 2227-B-55, and 5.4 parts Example 4, Run 5 Zinc Oxide paste was slowly added. Deionized water was added incrementally to a viscosity of 20.4 seconds in a number 4 Ford cup. This material was then adjusted with deionized water and dimethyl ethanol amine to 30% NV and 21.2 second viscosity in a number 4 Ford cup.

Using the process outlined in Example 5, Run 1, additional Gold coatings were prepared:

TABLE 5

| Ingredient (parts by wt.) | Ex. 5, Run: | | | | | | | |
|---|---|---|---|---|---|---|---|---|
| | 2 | 3 | 4 | 5 | 6 | 7 | 8 | 9 |
| Ex. 3, Run 2 | 800 | 878 | 715 | 774.6 | — | — | — | — |
| Ex. 3, Run 1 | — | — | — | — | 715 | — | — | — |
| Ex. 3, Run 4 | — | — | — | — | — | 723.1 | 1674 | 604 |
| Ex. 4, Run 5 | — | 4.3 | 5.4 | — | 5.4 | 7.1 | — | — |
| Ex. 4, Run 1 | — | — | — | — | — | — | — | 6.3 |
| Rutaphen 9989 | — | — | 44.2 | 47.9 | 44.2 | 58.6 | 135.7 | 49 |
| Santolink EP560 | — | — | 22.5 | 24.4 | 22.5 | 29.8 | 69.1 | 24.9 |
| Varcum 227-B-55 | — | — | 18.2 | 19.7 | 18.2 | 24.0 | 55.6 | 20.1 |
| Water | 20.2 | 22.5 | 118.6 | 108.5 | 80.9 | 107.3 | 248 | 89.4 |

Example 6

Preparation of White Coating Composition

Example 6, Run 1

In a quart can equipped with a metal stir propeller 115.9 parts of Example 3, Run 1 was added. Under agitation 115.9 parts PW0099B TiO$_2$ pigment, 17.2 parts butyl cellosolve, and 2.2 parts dimethyl ethanol amine was added. This material was ground until a grind of 7 to 7.5 on a Hegman grind gauge was achieved. Then 439.6 parts of additional Example 3, Run 1 was added. After mixing 2.6 parts Example 4, Run 5 Zinc Oxide paste, 18.0 parts Cymel 303, 9.7 parts bisphenol-A based phenolic solution, and 227.0 parts deionized water was added and stirred to uniformity. The mixture was then adjusted to 25.6 seconds viscosity on a number 4 Ford cup with dimethyl ethanol amine.

Example 7

Preparation of Gold and White Coating Compositions

Example 7, Runs 1 and 2

Table 7 details the formulation components of gold and white coating. Each coating was prepared in a 4-liter polyethylene plastic container. A stainless steel 'Hochmeyer-type' mixing blade was used to provide agitation and subsequent mixing to the vessel. An agitation rate of 1000 RPMs was used to prepare each coating. Each raw material was added to the container sequentially while the agitation rate was maintained at 1000 RPMs. Once an ingredient was added, a time period of 5-10 minutes was allowed for the ingredient to be adequately incorporated and the coating mixture fully homogenized. Once all ingredients were added, the coating was allowed to continue mixing for an additional 20-30 minutes to insure that all ingredients had been adequately incorporated. Following this 20-30 minute 'holding time', each coating was passed through a fiber filter in which the internal pore size was 10-microns. This was done to insure that the coating was free of any undesired particulate, insoluble matter which may negatively impact the sprayability or cured film performance of the coating variable.

TABLE 7

| | Example 7, Run: | |
|---|---|---|
| Ingredients | 1 Wt. % | 2 Wt. % |
| Ex. 3, Run 5 Dispersion | 47.63% | 36.36% |
| Ex. 4, Run 4 Titanium Dioxide Paste | 0.00% | 22.54% |
| Ex. 4, Run 2 Zinc Oxide Paste | 0.69% | 0.25% |
| Deionized Water | 16.60% | 0.00% |
| Rutaphen 9989 Phenolic Resin | 3.90% | 0.73% |
| Santolink EP 560 Phenolic Resin | 1.90% | 0.00% |
| Varcum 2227 Phenolic Resin | 1.60% | 0.00% |
| Cymel 303 | 0.00% | 1.76% |
| Ethylene Glycol, Monobutyl Ether | 0.00% | 0.90% |
| Deionized Water | 22.91% | 35.26% |
| N-Butanol | 4.50% | 1.80% |
| Dimethyl Ethanol Amine | 0.27% | 0.40% |
| Totals: | 100.00% | 100.00% |
| Coating Viscosity (# Ford Cup, 25° C.) | 16.0 seconds | 24.0 seconds |

Example 8

Preparation of Additional Gold and White Coating Compositions

Example 8, Runs 1 and 2

Additional coatings were developed and tested for spray application properties. As described below, these coatings were found to offer significantly improved spray application properties. The coatings were prepared as generally described in Example 7, with variations in the solvent systems. The formulations for these two coatings are shown below in Tables 8A and 8B.

TABLE 8A

| | Example 8, Run: | |
|---|---|---|
| Ingredient | 1 Wt. % | 2 Wt. % |
| Ex. 3, Run 5 Resin Base | 0.00% | 36.33% |
| Ex. 3, Run 6 Resin Base | 65.24% | 0.00% |
| Deionized Water | 23.20% | 0.00% |
| Ex. 4, Run 4 Titanium Dioxide Paste | 0.00% | 22.52% |
| Ex. 4, Run 2 Zinc Oxide Paste | 0.22% | 0.25% |
| Ethylene Glycol, Mono Butyl Ether | 3.98% | 0.00% |
| Deionized Water | 5.61% | 0.00% |
| Diethylene Glycol, Mono Hexyl Ether | 1.14% | 0.00% |
| Rutaphen 9989 Phenolic Resin | 0.00% | 0.73% |
| Cymel 303 | 0.00% | 1.76% |
| Ethylene Glycol, Monobutyl Ether | 0.00% | 0.90% |
| Deionized Water | 0.61% | 35.32% |
| N-Butanol | 0.00% | 1.79% |
| Dimethyl Ethanol Amine | 0.00% | 0.4% |
| Totals: | 100.00% | 100.00% |
| Coating Viscosity (# Ford Cup, 25° C.) | 20.0 seconds | 24.6 seconds |

TABLE 8B

| | Example 8, Run: | |
|---|---|---|
| Ingredient | 3 Wt. % | 4 Wt. % |
| Ex. 3, Run 7 Resin Base | 54.21% | 38.40% |
| Deionized Water | 8.53% | 33.44% |
| Rutaphen 9989 LB | 4.31% | 0.73% |
| Santolink EP 560 | 2.19% | 0.00% |
| Varcum 2227-B-55 | 1.77% | 0.00% |
| Cymel 303 | 0.00% | 1.75% |
| Deionized Water | 6.26% | 0.00% |
| Ethylene Glycol, Mono Butyl Ether | 3.74% | 0.90% |
| Deionized Water | 7.58% | 0.00% |
| Ethylene Glycol, Mono Hexyl Ether | 1.10% | 0.00% |
| Ex. 4, Run 6 Zinc Oxide Paste | 0.83% | 0.26% |
| Deionized Water | 3.94% | 0.00% |
| Deionized Water | 5.17% | 0.00% |
| Ex. 4, Run 7 TiO2 Paste | 0.00% | 22.42% |
| Butanol | 0.00% | 1.79% |
| Dimethyl Ethanol Amine | 0.37% | 0.28% |
| Cycat 600 | 0.00% | 0.03% |
| Totals: | 100.00% | 100.00% |
| Coating Viscosity (# Ford Cup, 25° C.) | 20.0 seconds | 20.0 seconds |

Example 9

Performance of White Coating Versus Control

TABLE 9

| | 10Q51EE Control ** Dome/Beads/ Headspace | Example 6, Run 1 Dome/Beads/ Headspace |
|---|---|---|
| Green Beans & 2.5% Brine | | |
| Corrosion | 10/10/6-10 | 10/10/7-10 |
| Adhesion | 10/10/7-10 | 10/10/10 |
| Carrots & 2.5% Brine | | |
| Corrosion | 10/10/9-10 | 10/10/10 |
| Adhesion | 10/10/9-10 | 10/10/10 |
| Pea Test | | |
| Corrosion | 10/10/6-10 | 10/10/4-9 |
| Adhesion | 10/10/5-9 | 10/10/4-9 |
| Surface Stain * | 8-9 | 7-9 |
| Pasta | | |
| Corrosion | 10/10/7-8 | 10/10/8-9 |
| Adhesion | 10/10/8-9 | 10/9-10/10 |
| Surface Stain | 8-9 | 8 |
| Chicken Broth | | |
| Corrosion | 10/10/8-9 | 10/10/9-9 |
| Adhesion | 10/10/9-10 | 10/10/9-10 |
| Surface Stain | 9 | 8 |
| Brine | | |
| Corrosion | 10/10/10 | 10/10/10 |
| Adhesion | 10/10/10 | 10/9-10/9-10 |
| Tomato Basil Soup | | |
| Corrosion | 10/10/10 | 10/10/10 |
| Adhesion | 10/10/9-10 | 10/10/10 |
| Surface Stain | 8 | 8 |

* A single overall reading was taken for the Surface Stain test.
** The control for the white coating was 10Q51EB, a commercially acceptable coating supplied by The Valspar Corporation.

Example 10

Performance of Gold Coatings

TABLE 10

| | Control * (10Q25) | Ex. 5, Run 2 | Ex. 5, Run 3 | Ex. 5, Run 4 | Ex. 5, Run 5 | Ex. 5, Run 7 | Ex. 5, Run 8 | Ex. 5, Run 9 |
|---|---|---|---|---|---|---|---|---|
| 2.5% Brine | | | | | | | | |
| Corrosion | 9/9/7 | 9.5/7/7 | 10/7.5/7 | 10/7.5/7 | 9.5/6/7 | 10/10/9.5 | 10/10/5.5 | 10/10/9 |
| Adhesion | 10/10/10 | 10/5.5/6.5 | 10/10/6.5 | 9/6.5/8.5 | 10/4.5/6 | 10/9.5/9.5 | 8.5/6.5/6.5 | 10/9.5/9 |
| NE Clam | | | | | | | | |
| Corrosion | 10/10/8 | 10/10/4.5 | 10/10/7 | 10/10/8 | 10/10/8 | 10/10/9 | 10/10/10 | 10/10/9 |

TABLE 10-continued

|   | Control * (10Q25) | Ex. 5, Run 2 | Ex. 5, Run 3 | Ex. 5, Run 4 | Ex. 5, Run 5 | Ex. 5, Run 7 | Ex. 5, Run 8 | Ex. 5, Run 9 |
|---|---|---|---|---|---|---|---|---|
| Adhesion | 10/10/9.5 | 10/10/5 | 10/10/6 | 10/10/8 | 10/10/8 | 10/10/9.5 | 10/10/9.5 | 10/10/9.5 |
| Stain | 9 | 6.5 | 7.5 | 7 | 7.5 | | | |
| Tomato Basil | | | | | | | | |
| | | | | | | | | |
| Corrosion | 10/10/9.5 | 10/10/7 | 10/10/6.5 | 10/10/9 | 10/10/8 | | | |
| Adhesion | 10/10/8 | 10/10/7.5 | 10/10/7.5 | 10/10/8.5 | 10/10/8.5 | | | |
| Chicken Broth | | | | | | | | |
| | | | | | | | | |
| Corrosion | | | | | | 10/10/10 | 10/10/10 | 10/10/10 |
| Adhesion | | | | | | 10/10/10 | 10/10/10 | 10/10/10 |
| Stain | | | | | | 10/4/7.5 | 4/3.5/7.5 | 10/7.5/8 |
| Pea Test | | | | | | | | |
| | | | | | | | | |
| Adhesion | | | | | | 10/10/9.5 | 10/8.5/7 | 7/10/8 |
| Stain | | | | | | 0/3/6 | 0/4/7 | 0/4/7 |

* The control for the gold coating variable was 10Q25AB, a commercially acceptable coating supplied by The Valspar Corporation.

Example 11

Spray Application Testing

One of the potential uses of the instant invention is as a waterborne spray coating for the interior of tinplate, drawn and ironed (D&I), two-piece food cans. These types of cans are becoming increasingly more prevalent within the food can industry.

To facilitate 'spray-application' of the coating prototype to the interior of commercially available, preformed, tinplate D&I cans, the viscosity of each coating was reduced such that the flow rate of each coating through a Ford viscosity cup (#4 orifice) was in the range of 16-30 seconds. This viscosity measurement was conducted with clean, filtered coating at a temperature of 25° C.

The application of each coating was conducted using a laboratory scale D&I spray unit commercially available from H.L Fisher Co. This laboratory unit is considered an effective replica of commercial D&I spray units.

The application and testing of each coating was performed on commercially available tinplate D&I cans with the commercial dimensions identified as '300×407'. This indicates a commercial can size whose height is 0.113 m and whose diameter is 0.076 m. This yields a can whose internal area is 0.032 m$^2$. All of the cans that were used for testing were also given the familiar 'sidewall beading' which imparts improved crush resistance to the can. In addition, each can was 'flanged', which allows for effective seaming/closure of the can with an appropriate '300 diameter' commercially available food can end.

For the gold coatings a sufficient amount of wet coating was delivered to the interior of the D&I can to yield a total, cured film weight of 250.0 mg per can. The white coatings were applied such that a total, cured film weight of 350.0 mg per can was obtained. These coating weights are consistent with those currently employed in the production of full scale, commercially coated tinplate D&I cans.

The cans were thermally cured using a laboratory-scale D&I can oven commercially available from Ross Co. The controls on this oven were programmed to deliver a thermal dosage that is consistent with thermal dosages employed in the preparation of commercially coated tinplate D&I cans. The residence time of each can within the oven was approximately 5.5 minutes. Each can achieved a maximum temperature of approximately 221° C. Each can was at a minimum temperature of 213° C. for approximately 2.0 minutes. Following this thermal drying process, an assessment of each coating's appearance, uniformity (dry film continuity) and other application-related properties were collected. The details of these analyses are found in Table 11 below.

TABLE 11

| Coating Code | 10Q25AB* | Ex. 7, Run 1 | 10Q51EA* | Ex. 7, Run 2 |
|---|---|---|---|---|
| Substrate | Commercially Available '300 × 407' Tinplate D&I Cans | | | |
| Film Weight | 240-260 mgs. per can | | 340-360 mgs. per can | |
| Coating Uniformity/ Metal Exposure | | | | |
| Range: | 0.0-1.8 mAs | 0.0-7.0 mAs | 0.0-7.0 mAs | 0.0-2.0 mAs |
| Average: | 0.7 mAs | 2.0 mAs | 0.6 mAs | 0.4 mAs |
| Coating Spreadability/ Wetting | Excellent | Good | Good | Good |
| Blistering | Excellent | Fair | Excellent | Fair |

*Commercially available products of The Valspar Corporation

Example 12

Cured Film Performance

Both the gold and white prototypes were evaluated for cured film properties against appropriate, commercially acceptable white and gold D&I spray control coatings. The results of this testing is seen in Tables 12A and 12B.

TABLE 12A

|   | 10Q25AB | Ex. 7, Run 1 |
|---|---|---|
| Split Pea, Ham, Bacon Soup | | |
| Adhesion | 10 | 9 |
| Corrosion | 10 | 9 |
| Fresh Carrots in 2.5% Brine | | |
| Adhesion | 10 | 8 |
| Corrosion | 10 | 8 |
| Three Bean Salad | | |
| Adhesion | 10 | 10 |
| Corrosion | 8 | 8 |
| Tomato Basil Soup | | |
| Adhesion | 9 | 9 |
| Corrosion | 8 | 6 |

TABLE 12A-continued

|  | 10Q25AB | Ex. 7, Run 1 |
|---|---|---|
| Chicken Broth | | |
| Adhesion | 10 | 10 |
| Corrosion | 10 | 10 |
| New England Clam Chowder | | |
| Adhesion | 9 | 8 |
| Corrosion | 7 | 4 |
| Pasta in Tomato Sauce | | |
| Adhesion | 8 | 8 |
| Corrosion | 5 | 7 |
| Cheddar Cheese Soup | | |
| Adhesion | 8 | 9 |
| Corrosion | 8 | 8 |

TABLE 12B

|  | 10Q51EA | Ex. 7, Run 2 |
|---|---|---|
| Creamed Corn | | |
| Adhesion | 10 | 10 |
| Corrosion | 10 | 7 |
| Fresh Carrots in 2.5% Brine | | |
| Adhesion | 9 | 10 |
| Corrosion | 9 | 10 |
| Fresh Green Beans in 2.5% Brine | | |
| Adhesion | 10 | 9 |
| Corrosion | 10 | 7 |
| Fresh Spinach | | |
| Adhesion | 9 | 10 |
| Corrosion | 9 | 6 |
| Chicken Broth | | |
| Adhesion | 10 | 10 |
| Corrosion | 10 | 10 |
| Diced Tomatoes | | |
| Adhesion | 9 | 10 |
| Corrosion | 2 | 3 |
| Fresh Peas in 2.5% Brine | | |
| Adhesion | 10 | 10 |
| Corrosion | 10 | 10 |

Example 13

Spray Properties of Gold & White Coatings

The spray performance properties of gold and white coatings were evaluated and are shown below in Table 13.

TABLE 13

|  | 10Q25AB* | Ex. 8, Run 1 | 10Q51EA* | Ex. 8, Run 2 |
|---|---|---|---|---|
| Substrate | Commercially Available '300 × 407' Tinplate D&I Cans | | | |
| Film Weight | 240-260 mgs. per can | | 340-360 mgs. per can | |
| Coating Uniformity/ Metal Exposure | | | | |
| Range: | 0.0-2.0 mAs | 0.0 mAs | 0.0-2.5 mAs | 0.0-3.0 mAs |
| Average: | 0.5 mAs | 0.0 mAs | 0.8 mAs | 0.8 mAs |
| Coating Spreadability/ Wetting | Excellent | Excellent | Good | Good |
| Blistering | Excellent | Good | Excellent | Good |

*Commercially available products of The Valspar Corporation

Example 14

A 12 liter flask is equipped with a stirrer, reflux condenser, thermocouple, heating mantle and nitrogen blanket. In a separate vessel a monomer premix containing 1030.8 parts styrene, 787.8 parts hydroxy propyl methacrylate, 56.9 parts glycidyl methacrylate, and 80.3 parts t-butyl peroctoate was prepared. To the 12 liter flask was added 217.3 parts butanol and 706.0 parts butyl cellosolve. The flask was heated to 98° C., and 12.6 parts t-butyl peroctoate was added. After 5 minutes the premix was added to the flask over three and a half hours while maintaining 96° C. to 100° C. A second initiator premix of 93.2 parts butyl cellosolve and 40.0 parts t-butyl peroctoate was prepared. When the monomer premix addition was complete, the premix vessel was rinsed with 38.0 parts butyl cellosolve. The second initiator premix was immediately added over a one hour period. When the initiator premix addition was complete, the vessel was rinsed with 23.7 parts butyl cellosolve. The batch was held at 98° C. to 99° C. for one hour. At the end of the hour 3.8 parts t-butyl peroctoate was added and the batch was held one hour. At the end of the hour a second addition of 3.8 parts t-butyl peroctoate was added and the batch was held an additional one hour. At the end of the hour a third addition of 3.8 parts t-butyl peroctoate was added and the batch was held one hour. The batch was then cooled. The following day the batch was heated to 50° C. and 950.5 parts of Example 2, Run 1 was added and 47.1 parts deionized water. The batch was then heated to a temperature of 96 to 100° C., 103.6 part dimethyl ethanol amine was added over five minutes. The batch was held for four hours at 99° C. to 100° C. At the end of the four hours, 17.5 parts dimethyl ethanol amine, 511.9 parts Rutaphen 9989 LB (60% solid phenolic solution from Bakelite AG), 264.4 parts Santolink EP 560 (80% solids Phenolic solution from Solutia), and 215.3 parts Varcum 2227-B-55 (55% solids phenolic solution from Reichhold) was added and stirred for 15 minutes and heated. After the 15 minutes, heat was discontinued and 2370.0 parts deionized water was added over one hour forty-five minutes. Then 2411.7 parts of deionized was added over 8 minutes. The batch was then cooled. The next day the batch was heated to reflux and 1300 parts of distillate was removed. The resulting dispersion was 34.1% NV with a pH of 6.88, and a particle size of 0.37 micron with a No. 4 Ford viscosity of 17 seconds.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. An article, comprising:
   a can end or a can body having a metal substrate with a film formed from a composition comprising an aqueous dispersion of a quaternary ammonium salt, wherein the salt comprises the reaction product of an oxirane-functional vinyl addition polymer having an oxirane functionality of 0.5 to 5; an acid-functional polymer having an acid number of 30 to 500; and a tertiary amine.

2. The article of claim 1, wherein the article comprises a packaging container including both the can end and the can body.

3. The article of claim 1, wherein the article comprises a food or beverage can or a food or beverage can end.

4. The article of claim 3, wherein the article is a 2-piece drawn food can, a 3-piece drawn food can, a food can end, a drawn and ironed food can, or a beverage can end.

5. The article of claim 1, wherein the metal substrate is aluminum or steel.

6. The article of claim 1, wherein the film is on an inside surface of the can end or the can body.

7. The article of claim 1, wherein the coating composition further comprises a crosslinker.

8. The article of claim 7, wherein the crosslinker comprises a phenoplast.

9. The article of claim 8, wherein the film includes at least 5% by weight of the phenoplast, based on the total weight of resin solids in the film.

10. The article of claim 8, wherein the phenoplast comprises a condensation product of (i) formaldehyde or acetaldehyde and (ii) phenol, cresol, p-phenylphenol, p-tert-butylphenol, p-tert-amylphenol, or cyclopentylphenol.

11. The article of claim 1, wherein the film comprises a cured film.

12. The article of claim 11, wherein the cured film includes a crosslinked polymer having a crosslink segment of the general formula:

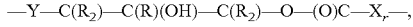

—Y—C(R$_2$)—C(R)(OH)—C(R$_2$)—O—(O)C—X$_r$—, wherein: Y is a divalent organic group; X is a divalent organic group; R is H, or a C1 to C6 organic group; and r is 0 or 1.

13. The article of claim 1, wherein the film is substantially free of BPA.

14. The article of claim 1, wherein the film is completely free of BPA and aromatic glycidyl ether compounds.

15. The article of claim 1, wherein the quaternary ammonium salt comprises at least 0.8 equivalents of tertiary amine per equivalent of oxirane group.

16. The article of claim 1, wherein the weight ratio of the oxirane-functional vinyl addition polymer to acid-functional polymer is between 90:10 and 50:50.

17. The article of claim 1, wherein the acid-functional polymer is an acid-functional vinyl addition polymer.

18. The article of claim 17, wherein the acid-functional vinyl addition polymer comprises 5 to 20 parts (by weight) styrene, 30 to 70 parts alkyl (meth)acrylate, and 30 to 70 parts acid-functional monomer.

19. The article of claim 1, wherein the oxirane-functional vinyl addition polymer has a number average molecular weight of 2,500 to 20,000 and the acid-functional polymer has a number average molecular weight of from 2,000 to 15,000.

20. An article, comprising:
a can end or a can body having a metal substrate with a film formed from an aqueous dispersion comprising a reaction product of:
an oxirane-functional vinyl addition polymer having an oxirane functionality of 0.5 to 5 and a number average molecular weight of 2,500 to 20,000;
an acid-functional polymer having an acid number of 30 to 500 and a number average molecular weight of 2,000 to 15,000, wherein the acid-functional polymer is a vinyl polymer formed as the reaction product of at least 15% by weight of acid-functional monomer; and
a tertiary amine;
wherein the weight ratio of the oxirane-functional vinyl addition polymer to acid-functional polymer is 90:10 to 50:50 and the ratio of amine:oxirane groups is 0.8:1 to 5:1; and
wherein the oxirane-functional vinyl addition polymer having an oxirane functionality of 0.5 to 5 and the acid-functional polymer having an acid number of 30 to 500 were reacted together in the presence of the tertiary amine.

21. The article of claim 2, wherein the film is on an interior surface of the packaging container, and wherein the packaging container contains a food or beverage product in contact with the film.

22. An article of claim 20, wherein the article comprises a 2-piece can or a 3-piece can.

23. The article of claim 20, wherein the article comprises a food or beverage can including one or both of the can end or can body, wherein the film is located on an inside surface of the food or beverage can.

24. The article of claim 23, wherein the food or beverage can contains a food or beverage product in contact with the film.

* * * * *